(12) United States Patent
Andersson et al.

(10) Patent No.: US 11,733,973 B2
(45) Date of Patent: Aug. 22, 2023

(54) INTERACTIVE GRAPHIC DESIGN SYSTEM TO ENABLE CREATION AND USE OF VARIANT COMPONENT SETS FOR INTERACTIVE OBJECTS

(71) Applicant: Figma, Inc., San Francisco, CA (US)

(72) Inventors: Rasmus Andersson, San Francisco, CA (US); Sho Kuwamoto, San Francisco, CA (US); Nikolas Klein, San Francisco, CA (US); James Wong, San Francisco, CA (US); Ryan Kaplan, San Francisco, CA (US); Kelsey Whelan, San Francisco, CA (US); Matthew Huang, San Francisco, CA (US); Sawyer Hood, San Francisco, CA (US); Andrew Heine, San Francisco, CA (US); Jessica Liu, San Francisco, CA (US); Marcin Wichary, San Francisco, CA (US); Linda Zhang, San Francisco, CA (US); Josh Shi, San Francisco, CA (US); Golf Sinteppadon, San Francisco, CA (US); Naomi Jung, San Francisco, CA (US); Andrew Chan, San Francisco, CA (US); Daniel Furse, San Francisco, CA (US)

(73) Assignee: Figma, Inc.

( * ) Notice: Subject to any disclaimer, the term of this patent is extended or adjusted under 35 U.S.C. 154(b) by 0 days.

(21) Appl. No.: 17/477,293

(22) Filed: Sep. 16, 2021

(65) Prior Publication Data

US 2022/0083316 A1 Mar. 17, 2022

Related U.S. Application Data

(60) Provisional application No. 63/079,473, filed on Sep. 16, 2020, provisional application No. 63/153,335, filed on Feb. 24, 2021.

(51) Int. Cl.
*G06F 8/20* (2018.01)

(52) U.S. Cl.
CPC ................................. *G06F 8/24* (2013.01)

(58) Field of Classification Search
CPC ........................................................ G06F 8/24
(Continued)

(56) References Cited

U.S. PATENT DOCUMENTS 6,983,227 B1 * 1/2006 Thalhammer-Reyero ...................
G16B 50/20
703/2
7,356,679 B1 * 4/2008 Le ......................... G06F 16/116
713/1

(Continued)

FOREIGN PATENT DOCUMENTS

EP 0576178 12/1993
EP 2775397 A2 9/2014
(Continued)

OTHER PUBLICATIONS

Jarzabek et al, "XVCL: XML-based Variant Configuration Language", IEEE, pp. 1-2 (Year: 2003).*

(Continued)

*Primary Examiner* — Anil Khatri
(74) *Attorney, Agent, or Firm* — Mahamedi IP Law LLP

(57) ABSTRACT

An interactive graphic design system design interface is described to enable design users to create a variant component that links multiple design elements as variants, where each variant represents a state or version of a run-time object, feature or user-interface.

29 Claims, 13 Drawing Sheets

(58) Field of Classification Search
USPC .................................................. 717/101–120
See application file for complete search history.

(56) References Cited

U.S. PATENT DOCUMENTS

| | | | |
|---|---|---|---|
| 7,499,045 B2* | 3/2009 | Itoh | G06T 11/60 |
| | | | 345/418 |
| 7,752,559 B1* | 7/2010 | Szpak | G06F 8/10 |
| | | | 715/764 |
| 7,865,857 B1* | 1/2011 | Chopra | G06F 30/30 |
| | | | 716/119 |
| 8,312,416 B2* | 11/2012 | Freund | G06F 8/10 |
| | | | 717/102 |
| 8,370,757 B2 | 2/2013 | Tinari | |
| 8,612,849 B2 | 12/2013 | Boreham | |
| 8,645,105 B1* | 2/2014 | Shepherd | G06T 11/206 |
| | | | 703/1 |
| 8,938,679 B1* | 1/2015 | Hsu | G06F 16/957 |
| | | | 715/230 |
| 9,182,948 B1* | 11/2015 | O'Riordan | G06F 30/30 |
| 9,430,229 B1 | 8/2016 | Zijst | |
| 9,772,682 B1 | 9/2017 | Meenakshisundaram | |
| 9,841,880 B1* | 12/2017 | Beaty | G06Q 50/01 |
| 10,114,733 B1* | 10/2018 | Varghese | G06F 8/38 |
| 10,181,059 B1* | 1/2019 | Brewton | G06G 7/64 |
| 10,268,525 B2 | 4/2019 | Beckett | |
| 10,955,803 B1* | 3/2021 | Kourliouros | G05B 19/056 |
| 10,997,217 B1* | 5/2021 | Nielsen | G06F 16/287 |
| 2002/0032554 A1 | 3/2002 | Nakagawa | |
| 2005/0094206 A1 | 5/2005 | Tonisson | |
| 2008/0282188 A1 | 11/2008 | Hays | |
| 2012/0124492 A1 | 5/2012 | Taron | |
| 2013/0120368 A1 | 5/2013 | Miller | |
| 2013/0232403 A1 | 9/2013 | Abrahami | |
| 2014/0310660 A1 | 10/2014 | Rosen | |
| 2014/0351110 A1 | 11/2014 | Lidor | |
| 2015/0092228 A1 | 4/2015 | Okabyashi | |
| 2015/0105875 A1 | 4/2015 | Tran | |
| 2015/0160838 A1 | 6/2015 | Shirabe | |
| 2016/0048388 A1 | 2/2016 | Eksten | |
| 2016/0246899 A1 | 8/2016 | Hirschtick | |
| 2017/0046317 A1 | 2/2017 | Geva | |
| 2017/0337321 A1 | 11/2017 | Hoford | |
| 2019/0114817 A1 | 4/2019 | Kerr | |
| 2019/0325626 A1* | 10/2019 | Tao | G06F 40/106 |
| 2019/0369822 A1 | 12/2019 | Tzeng | |
| 2020/0233624 A1 | 7/2020 | Peng | |
| 2021/0141515 A1 | 5/2021 | Wichary | |
| 2021/0247967 A1 | 8/2021 | Wichary | |
| 2022/0129142 A1 | 4/2022 | Wichary | |
| 2022/0156422 A1 | 5/2022 | Kuwamoto | |

FOREIGN PATENT DOCUMENTS

| | | |
|---|---|---|
| EP | 3293619 | 3/2018 |
| EP | 3633472 A1 | 4/2020 |
| WO | WO-2009/132444 A1 | 11/2009 |
| WO | WO-2021/097141 | 5/2021 |
| WO | WO-2021/159079 | 8/2021 |
| WO | WO-2022/061027 | 3/2022 |
| WO | WO-2022/109200 | 5/2022 |

OTHER PUBLICATIONS

Kriouile et al, "Towards Flexible and Reusable SaaS for Multi-tenancy", IEEE, pp. 1-7 (Year: 2014).*
Pereira et al, "A Canvas for Participation-Centered Game Design", ACM, pp. 521-532 (Year: 2019).*
DeLine et al, "Debugger Canvas: Industrial Experience with the Code Bubbles Paradigm", IEEE, pp. 1064-1073 (Year: 2012).*
Roth et al, "Interactive Graphic Design Using Automatic Presentation Knowledge", ACM, pp. 112-117 (Year: 1994).*
DeLine et al, "Code Canvas: Zooming towards Better Development Environments", ACM, pp. 207-210 (Year: 2010).*
International Search Report and the Written Opinion of the International Searching Authority dated Jul. 1, 2022, for related PCT/US2022/025626 filed Apr. 20, 2022, 17 pages.
Wallace Evan: "Multiplayer Editing in Figma", figma.com/blog, Sep. 28, 2016 (Sep. 28, 2016), XP055930547, Retrieved from the Internet: URL: https://www.figma.com/blog/multiplayer-editing-in-figma/ [retrieved on Jun. 13, 2022] the whole document, 7 pages.
Anonymous: "Change cursor into custom text", Dec. 24, 2018 (Dec. 24, 2018), XP055930588, Retrieved from the Internet: URL: https://stackoverflow.com/questions/53916492/change-cursor-into-custome-text [retrieved on Jun. 13, 2022] the whole document, 2 pages.
International Search Report and the Written Opinion of the International Searching Authority dated Jul. 25, 2022, for related PCT/US2022/025840 filed Apr. 201, 2022, 17 pages.
Paper by WeTransfer—Simple Sketch App, "Creativity at your fingertips" URL:https://web.archive.org/web/20220121205009/https://wetransfer.com/paper, 9 pages.
International Search Report and the Written Opinion of the International Searching Authority dated Jan. 17, 2021, for related PCT/US2020/060300 filed Nov. 12, 2020, 13 pages.
International Search Report and the Written Opinion of the International Searching Authority dated May 21, 2021, for related PCT/US2021/017093 filed Feb. 8, 2021, 16 pages.
Tutorialspoint.com: "Microsoft Visio Themes and Styles", Nov. 30, 2018, XP055801565, Retrieved from the Internet: URL: https://web.archive.org/web/20181130054605/https://www.tutorialspoint.com/microsoft_visio/microsoft_visio_themes_styles.htm [retrieved on May 5, 2021]; 3 pages.
International Search Report and the Written Opinion of the International Searching Authority dated Dec. 22, 2021, for related PCT/US2021/050734 filed Sep. 16, 2021, 66 pages.
International Search Report and the Written Opinion of the International Searching Authority dated Feb. 23, 2022, for related PCT/US2021/059987 filed Nov. 18, 2021, 12 pages.
IBM: "IBM VisualAge for Java, Version 3.5—Visual Compisition", 2000, pp. 1-253, XP055890198, Retrieved from the Internet: URL:http://www.inf.fu-berlin.de/inst/ag-db/software/VAJ_PDF/jvbpdf.pdf [retrieved on Feb. 10, 2022] section titled "Layout managers in visual composition" at pp. 14-17 section titled "Setting a layout manager during visual composition" at p. 60 first paragraph of the section titled "Null Layout" at p. 17.

* cited by examiner

US 11,733,973 B2

INTERACTIVE GRAPHIC DESIGN SYSTEM TO ENABLE CREATION AND USE OF VARIANT COMPONENT SETS FOR INTERACTIVE OBJECTS

RELATED APPLICATIONS

This application claims benefit of priority to U.S. Provisional Patent Application No. 63/079,473, filed Sep. 16, 2020; and to U.S. Provisional Patent Application No. 63/153,335, filed Feb. 24, 2021; the aforementioned priority applications being hereby incorporated by reference in their respective entireties.

TECHNICAL FIELD

Examples described herein relate to an interactive graphic design system to enable creation and use of variant component sets for interactive objects.

BACKGROUND

Software design tools have many forms and applications. In the realm of application user interfaces, for example, software design tools require designers to blend functional aspects of a program with aesthetics and even legal requirements, resulting in a collection of pages which form the user interface of an application. For a given application, designers often have many objectives and requirements that are difficult to track.

A typical user-interface (executing at run-time) uses numerous dynamic and interactive features, such as soft-buttons and embedded content, which change state (e.g., change color or appearance) as a response to predetermined events. In order to design such features, UI designers (or design users) typically create separate components for each state of an interactive feature. For example, under conventional approaches, the design of a single soft-button on a user-interface may include separate design components to represent each run-time state of the soft-button. Thus, the design of a soft-button would have separate components for run-time states of "normal", "pressed" and "disabled" of the soft-button.

DETAILED DESCRIPTION

Figure 1A:
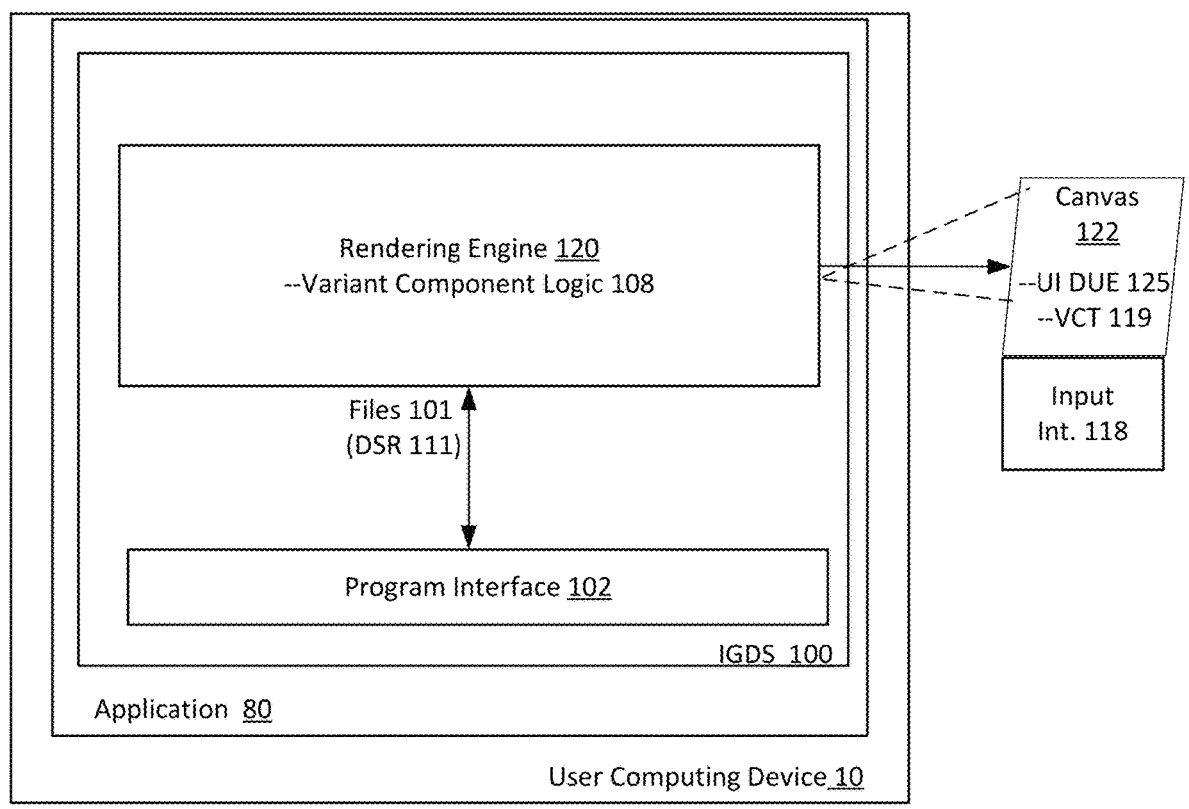
FIG. 1A illustrates an interactive graphic design system for a computing device of a user, according to one or more examples.

An interactive graphic design system is described to enable design users to create a variant set (alternatively referred to as "variant component" or "variant component set") that logically links multiple design elements ("variants"), where each variant represents a state or version of a run-time object. Accordingly, in examples, a variant can correspond to a design element (e.g., component) that represents a state or version of a designed feature for an end-product (e.g., functional user-interface).

An example interactive graphic design system as described can be implemented on a computing system for design users, such as user interface designers ("UI designers"), web designers, and web developers. Still further, in some examples, a network computer system is provided to include memory resources store a set of instructions, and one or more processors are operable to communicate the set of instructions to a plurality of user devices. The set of instructions can be communicated to user computing devices, in connection with the user computing devices being operated to render a corresponding user-interface (UI) design on a canvas, where the UI design under edit can be edited by design input. In this way, the network computer system can enable the use of a design system over a network environment. In some examples, the network environment can be collaborative, such that multiple design users collaborate on a UI design at one time.

Among other improvements, examples recognize that the conventional approach of creating separate and independent design components for a single interactive feature of the end product results in numerous inefficiencies. On the actual design interface, the multiplicity of components can clutter menus and tool panels of the software design tool. Moreover, the design user must track which components are for a particular end-product feature—if, for example, the end product user-interface utilizes multiple soft-buttons that are similar, tracking which components belong to features of the end-product can become tedious and inefficient.

Additionally, in a collaborative design tool environment, multiple design users may collaborate to create components for different interactive features of the end product, causing some design users to be unfamiliar with newly created or modified components of a feature that the designer is actively working on. Thus, a designer may unknowingly replicate a component that was created for a particular state of the interactive feature, simply because of clutter on the design interface and lack of familiarity by the design user as to work which may have been done by other collaborating design users.

Moreover, under conventional approaches, components that are intended to represent different states of an interactive feature are not logically linked. This disjointed approach to creating and managing different components for a common interactive feature can impede the design workflow because the components to represent the interactive feature are not organized in a manner that matches the mental model that design users may have for that interactive feature and its states.

According to embodiments, an interactive graphic design system enables design users to create variant sets, where each variant set logically links multiple constituent variants. Each variant of the variant set can define a corresponding state of a run-time object. During a design phase, the interactive graphic design system can render each of the variants at one time. Further, as described with some examples, interactions can be defined and visually represented on the canvas to indicate a state flow for an interactive object that is represented by the variant set. In some examples, the interactions can be implemented in the form of line connectors or noodles that connect objects to indicate a sequence of the desired state flow.

Examples as described provide numerous improvements over conventional approaches. As described, examples enable the creation and use of a variant set that logically links constituent variants that are intended to represent different states or versions of an interactive object, user-interface or feature.

Additionally, in examples, a variant set represents an interactive feature of an end product, and the variant component's representation on the design interface can be structured to eliminate clutter that would otherwise be present under conventional approaches where design users may create and separately manage components for such features.

Moreover, by logically linking variants that represent different states of the interactive element, the variant component can also better match the mental model the design user has for the end-produce interactive feature. The variants of a variant set can be rendered on a canvas at one time. Further, in some examples, interactions can be defined and visually represented as line connectors or noodles that interconnect pairs of variants. The rendering of the variants at one time, combined with the visual representation of the interactions, enable the design user to have a better mental model of an interactive object represented by the variant set. Accordingly, an example interactive graphic design system as described better enables a one-to-one mapping between the design element under design (e.g., individual variants of a variant set) and an interactive object of an end product.

Examples also facilitate a collaborative environment, as the individual variants of a variant set can be made available through layer-type structuring. The layer-type structuring allows individual designers to readily identify and contribute to design aspects of individual components that correspond to particular states of the interactive features.

Additionally, in software design, it is beneficial for design users to reuse prior creations. An example interactive graphic design system enables a design user to create a component set that includes a main component, and one or more dependent components that are created as instances of the main component. When changes are made to the main component, the dependent components are automatically updated to reflect the changes made to the main component. As described, an example interactive graphic design system can further enable the design user to create variants from a main component, such that the run-time behavior defined by the variants is automatically linked to the main component and its dependent components. In this way, each component of the component set can provide a same interactivity for a run-time object, where the interactivity is determined by the variant set.

Examples recognize that component sets are typically saved and replicated by design users for multiple projects. Among other advantages, enable designers to save the design of the entire interactive feature as one object (e.g., set of files), rather than separate components. As a result, examples enable a more efficient and organized design library to be stored and maintained for design users.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates an interactive graphic design system for a computing device of a user, according to one or more examples. An interactive graphic design system ("IGDS") 100 can be implemented in any one of multiple different computing environments. For example, in some variations, the IGDS 100 can be implemented as a client-side application that executes on the user computing device 10 to provide functionality as described with various examples. In other examples, such as described below, the IGDS 100 can be implemented through use of a web-based application 80. As an addition or alternative, the IGDS 100 can be implemented as a distributed system, such that processes described with various examples execute on a network computer (e.g., server) and on the user device 10.

According to examples, the IGDS 100 can be implemented on a user computing device 10 to enable a corresponding user to design various types of interfaces using graphical elements. The IGDS 100 can include processes that execute as or through a web-based application 80 that is installed on the computing device 10. As described by various examples, web-based application 80 can execute scripts, code and/or other logic (the "programmatic components") to implement functionality of the IGDS 100. Additionally, in some variations, the IGDS 100 can be implemented as part of a network service, where web-based application 80 communicates with one or more remote computers (e.g., server used for a network service) to executes processes of the IGDS 100.

In some examples, web-based application 80 retrieves some or all of the programmatic resources for implementing the IGDS 100 from a network site. As an addition or alternative, web-based application 80 can retrieve some or all of the programmatic resources from a local source (e.g., local memory residing with the computing device 10). The web-based application 80 may also access various types of data sets in providing the IGDS 100. The data sets can correspond to files and libraries, which can be stored remotely (e.g., on a server, in association with an account) or locally.

In examples, the web-based application 80 can correspond to a commercially available browser. In such examples, the processes of the IGDS 100 can be implemented as scripts and/or other embedded code which web-based application 80 downloads from a network site. For example, the web-based application 80 can execute code that is embedded within a webpage to implement processes of the IGDS 100. The web-based application 80 can also execute the scripts to retrieve other scripts and programmatic resources (e.g., libraries) from the network site and/or other local or remote locations. By way of example, the web-based application 80 may execute JAVASCRIPT® embedded in an HTML resource (e.g., web-page structured in accordance with HTML 5.0 or other versions, as provided under standards published by W3C or WHATWG consortiums). In some examples, the rendering engine 120 and/or other components may utilize graphics processing unit (GPU) accelerated logic, such as provided through WebGL (Web Graphics Library) programs which execute Graphics Library Shader Language (GLSL) programs that execute on GPUs.

According to examples, user of computing device 10 operates web-based application 80 to access a network site, where programmatic resources are retrieved and executed to implement the IGDS 100. In this way, a design user may initiate a session to implement the IGDS 100 for purpose of designing a run-time user interface for an application or program. In examples, the IGDS 100 includes a program interface 102, a design interface 118, and a rendering engine 120. The program interface 102 can include one or more processes which execute to access and retrieve programmatic resources from local and/or remote sources.

In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive graphic tools (e.g., design tool panels 318, see FIG. 3A through FIG. 3F) that integrate with the canvas 122 and which comprise the design interface 118, to enable the design user to provide input for creating and/or editing the design of the user interface.

According to some examples, the design interface 118 can be implemented as a functional framework that is integrated with the canvas 122 to detect and interpret user input. The design interface 118 can, for example, use a reference of the canvas 122 to identify a screen location of a user input (e.g., 'click'). Additionally, the design interface 118 can interpret an input action of the design user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the design user can specify (e.g., right-click, screen-tap, etc.) through one or more input devices. In this manner, the design interface 118 can interpret, for example, a series of inputs as a design tool selection (e.g., shape selection based on location of input), as well as inputs to define attributes (e.g., dimensions) of a selected shape.

Additionally, the program interface 102 can be used to retrieve, from local or remote sources, programmatic resources and data sets which include files 101 which comprise an active workspace for the design user. The retrieved data sets can include one or more pages that include design elements which collectively form a UI design under edit. Each file 101 can include one or multiple data structure representations 111 which collectively define the design interface. The files 101 may also include additional data sets which are associated with the active workspace.

In examples, the rendering engine 120 uses the data structure representations 111 to render a corresponding UI design under edit 125 on the canvas 122, wherein the UI design under edit 125 reflects graphic elements and their respective attributes as provided with the individual pages of the files 101. The design user can edit the UI design under edit 125 using the design interface 118. Alternatively, the rendering engine 120 can generate a blank page for the canvas 122, and the design user can use the design interface 118 to generate the UI design under edit 125. As rendered, the UI design under edit 125 can include graphic elements such as a background and/or a set of objects (e.g., shapes, text, images, programmatic elements), as well as attributes of the individual graphic elements. Each attribute of a graphic element can include an attribute type and an attribute value. For an object, the types of attributes include, shape, dimension (or size), layer, type, color, line thickness, text size, text color, font, and/or other visual characteristics. Depending on implementation, the attributes reflect properties of two- or three-dimensional designs. In this way, attribute values of individual objects can define, for example, visual characteristics of size, color, positioning, layering, and content, for elements that are rendered as part of the UI design under edit 125.

In examples, individual design elements may also be defined in accordance with a desired run-time behavior. By way of example, some objects can be defined to have run-time behaviors that are either static or dynamic. The attributes of dynamic objects may change in response to predefined run-time events generated by the underlying application that is to incorporate the UI design under edit 125. Additionally, some objects may be associated with logic that defines the object as being a trigger for rendering or changing other objects, such as through implementation of a sequence or workflow. Still further, other objects may be associated with logic that provides the design elements to be conditional as to when they are rendered and/or their respective configuration or appearance when rendered. Still further, objects may also be defined to be interactive, where one or more attributes of the object may change based on user-input during the run-time of the application.

The design interface 118 can process at least some user inputs to determine input information 127, where the input information 127 indicates (i) an input action type (e.g., shape selection, object selection, sizing input, color selection), (ii) an object that is directly indicated by the input action (e.g., object being resized), (iii) a desired attribute that is to be altered by the input action, and/or (iv) a desired value for the attribute being altered. The rendering engine 120 can receive the input information 127, and the rendering engine 120 can implement changes indicated by the input information 127 to update the UI design under edit 125. When changes are implemented to the UI design under edit 125, the changes can also be reflected in the accompanying data structure representations 111 for the UI design under edit 125.

According to examples, the IGDS 100 can execute variant component logic 108 to enable design users to create, modify and reuse variant components when working on the UI design under edit 125. The IGDS 100 can implement the variant component logic 108 in connection with providing the design interface 118. The IGDS 100 can implement the variant component logic 108 to define variant components to have constituent variants, with each variant being a design element (e.g., components) that is logically linked to other variants of the variant component. In particular, the variants of a variant component can share one or multiple predefined state properties, with each variant having a particular value for the state property or properties, such that each variant is unique amongst the variants of the variant component with respect to the state property values that are assigned to that variant. By way of example, the variant component can include a button, and each variant of the variant component defines a state of a run-time button feature. In such an example, the state property that may vary amongst the variants can be a fill pattern, and each variant of the variant component can be assigned to one of multiple possible property values (e.g., one of N fill patterns, where the run-time button feature is to have N states). Accordingly, each variant of the variant component is assigned to one property value (or combination of property values) of each property (or properties) that is used to define a state of the run-time object. As described with some examples, the state property and state property values of variant components may be shared with a run-time environment (e.g., such as may be provided through a developer tool) that references the property values in the course of generating a functional interactive object (e.g., user-interface element that is based on the variant component). In this manner, each variant can be used at run-time to render a state or version of the interactive object through execution of the run-time environment referencing the state property value(s) of that variant.

In examples, the IGDS 100 can implement the variant component logic 108 to enable a new variant component to be defined from rendered design elements on the canvas 122. A design user can, for example, render multiple components on canvas 122, and then specify selection input to select the multiple design elements as variants of a variant component. The action causes the IGDS 100 to define the selected design elements as a variant component. Once a variant is defined, the IGDS 100 can store the variant component, so that the variant component is reusable. Additionally, some examples, the action to define a new variant can leave the rendered constituent design elements unchanged on the canvas 122.

In examples, the IGDS 100 enables the design user to define a variant component by adding a new variant to a previously defined variant component. For example, the design user can select to add a new design element that is rendered on the canvas 122 to an existing variant component. In an example such as shown and described with FIG. 3C, the IGDS 100 can provide a feature that is provided with the canvas (e.g., with variants of the variant component) to enable the design user to add a new design element as a constituent of an existing variant component.

According to examples, the IGDS 100 can enable the design user to create new variant components, or to retrieve previously created variant components. A variant component that is defined or retrieved for use with a particular UI design under edit 125 can be rendered on the canvas 102 in use. In examples, the IGDS 100 can reflect a new or retrieved variant component by generating a variant design tool 119 that is specifically for the variant component on the design interface 118. The IGDS 100 can generate the variant design tool 119 to include a graphic representation of an existing variant component, such as a variant component in use. For example, the variant design tool 119 can reflect an appearance (e.g., default variant) of one of the variants of a variant component that is in use.

In examples, the variant design tool 119 can be operated to cause the variants of the variant component to be rendered at one time on the canvas 122. The variant design tool 119 can further reflect the layer type structure of the variant component. For example, the variant design tool 119 can include an indicator for each layer of the variant component, with each indicator being selectable to render the represented variant on the canvas 122, and/or to remove the rendering of the represented variant from the canvas 122. In this way, the design user can operate the variant design tool 119 to select which variants of the variant component are to be rendered on the canvas 122 at a particular time.

Still further, the variant component can be structured as a layer type, with each variant representing a layer of the layer type. As described with examples, the interactive element may be responsive to a corresponding event to transition amongst multiple states, wherein each of the multiple states is based on one of the multiple constituent variants of the variant component that is associated with the interactive element.

As further described with some examples, the IGDS 100 can further implement the variant component logic 108 to enable additional variant component functionality. For example, as described with an example of FIG. 3E, variant components can be multi-dimensional, with each variant component being associated with multiple properties. For multi-dimensional variant components, the IGDS 100 can assign each variant to one combination of state property values, such that each combination of state property values is assigned to one variant and represents one of multiple possible states of the represented interactive object. Moreover, in examples, the IGDS 100 can enforce rules relating to how variant components are to be defined and used. For example, the IGDS 100 can enforce (i) a rule to assign only one variant of a variant component to a state property value of a single-dimension variant component, such that each state property value is assigned to only property value of the associated property; and (ii) a rule to assign only one variant to each combination of state property values for each of multiple properties associated with a multi-dimensional variant component, such that each combination of state property values for the associated state properties of the multi-dimensional property are assigned to only one variant. The IGDS 100 may generate error states, messages or prompts when such rules are violated by the designer.

In examples, the IGDS 100 can further implement the variant component logic 108 to generate a property sub-panel 330 (see FIG. 3E) that identifies each associated state property and state property value of the variant component. The design user can interact with the property panel to filter and/or sort variants of the variant component based on state property values, with the variants identified by the filter/sorting operations being rendered on the canvas 122 at one time.

The IGDS 100 can further implement the variant component logic 108 to enable the design user to add state properties to existing variant components. For example, the design user can interact with the property panel to define a new state property for the variants of the variant component, as well as to specify new property values for the newly associated property. Additionally, the design user can reassign variants to different state property values and/or add new state property values to associated properties of a variant component.

Still further, in some examples, the IGDS 100 can implement the variant component logic 108 to automatically determine a state property to associate with a selection of design elements or variants. The IGDS 100 can, for example, identify a common attribute of a selection of design elements or variants. If a common attribute is identified for a selection of variants, where the common attribute (e.g., fill color) is not reflected by an existing property association of the variant component, the IGDS 100 can determine the state property as a new property to associate with the selection that is based on the identified common attribute (e.g., "fill color"). Similarly, the state property values of the newly identified property can also be automatically determined, based on the identified property. Conversely, in some examples, if the common attribute is not identified for a selection of variants, the design user can be prompted to specify the state property and state property value for the selection.

Network Computing System to Implement IGDS

Figure 1B:
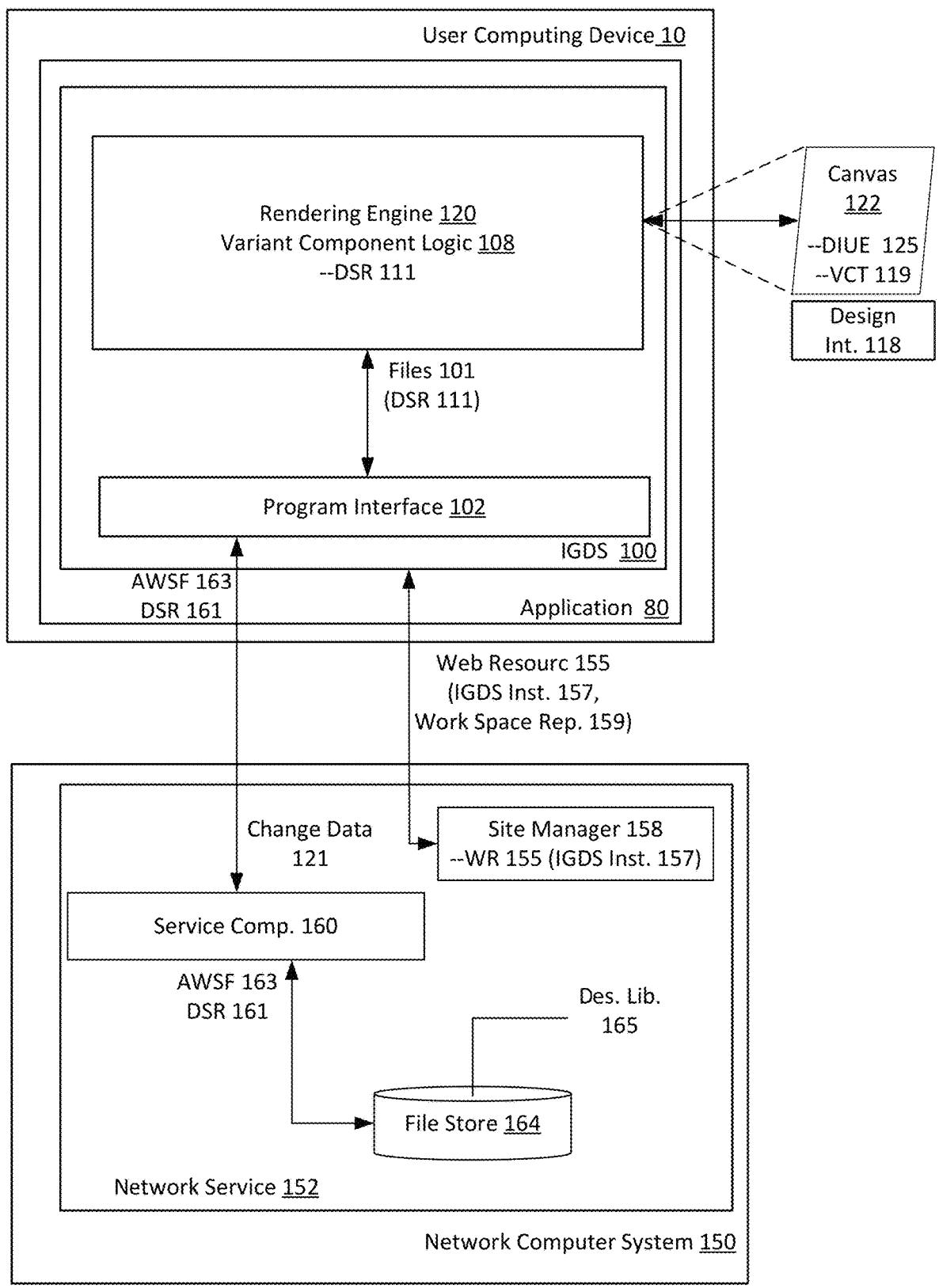
FIG. 1B illustrates a network computing system to implement an interactive graphic design system on a user computing device, according to one or more examples.

FIG. 1B illustrates a network computing system to implement an interactive graphic design system on a user computing device, according to one or more examples. A network computing system such as described with an example of FIG. 1B can be implemented using one or more servers which communicate with user computing devices over one or more networks.

In an example of FIG. 1B, the network computing system 150 perform operations to enable the IGDS 100 to be implemented on the user computing device 10. In variations, the network computing system 150 provides a network service 152 to support the use of the IGDS 100 by user computing devices that utilize browsers or other web-based applications. The network computing system 150 can include a site manager 158 to manage a website where a set of web-resources 155 (e.g., web page) are made available for site visitors. The web-resources 155 can include instructions, such as scripts or other logic ("IGDS instructions 157"), which are executable by browsers or web components of user computing devices.

In some variations, once the computing device 10 accesses and downloads the web-resources 155, web-based application 80 executes the IGDS instructions 157 to implement functionality such as described with some examples of FIG. 1A. For example, the IGDS instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of the program interface 102, causing the IGDS 100 to retrieve additional programmatic resources and data sets for implementing functionality as described by examples. The web-resources 155 can, for example, embed logic (e.g., JAVASCRIPT® code), including GPU accelerated logic, in an HTLM page for download by computing devices of users. The program interface 102 can be triggered to retrieve additional programmatic resources and data sets from, for example, the network service 152, and/or from local resources of the computing device 10, in order to implement the IGDS 100. For example, some of the components of the IGDS 100 can be implemented through web-pages that can be downloaded onto the computing device 10 after authentication is performed, and/or once the design user performs additional actions (e.g., download one or more pages of the workspace associated with the account identifier). Accordingly, in examples as described, the network computing system 150 can communicate the IGDS instructions 157 to the computing device 10 through a combination of network communications, including through downloading activity of web-based application 80, where the IGDS instructions 157 are received and executed by web-based application 80.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

The service component 160 can retrieve the files of an active workspace ("active workspace files 163") that are linked to the user account or identifier from a file store 164. The profile store 166 can also identify the workspace that is identified with the account and/or user, and the file store 164 can store the data sets that comprise the workspace. The data sets stored with the file store 164 can include, for example, the pages of a workspace, data sets that identify constraints for an active set of workspace files, and one or more data structure representations 161 for the design under edit which is renderable from the respective active workspace files.

The service component can also retrieve files which define one or more variant components that were created in prior sessions and/or with other projects. The variant components which are created, or accessed and used with the active workspace, can be saved in association with the active workspace. Additionally, in some examples, such variant components can be stored in a directory or design library, which can be located on the user computing device 10 or network computing system 150.

In examples, the service component 160 provides a representation 159 of the workspace associated with the design user to the web-based application 80, where the representation identifies, for examples, individual files associated with the design user and/or user account. The workspace representation 159 can also identify a set of files, where each file includes one or multiple pages, and each page including objects that are part of a design interface.

On the user device 10, the design user can view the workspace representation through web-based application 80, and the design user can elect to open a file of the workspace through web-based application 80. In examples, upon the design user electing to open one of the active workspace files 163, web-based application 80 initiates the canvas 122. For example, the IGDS 100 can initiate an HTML 5.0 canvas as a component of web-based application 80, and the rendering engine 120 can access one or more data structures representations 111 of a UI design under edit, to render the corresponding UI design under edit 125 on the canvas 122.

In examples, the changes implemented by the rendering engine 120 to the UI design under edit 125 can also be recorded with the respective data structure representations 111, as stored on the computing device 10. The program interface 102 can repeatedly, or continuously stream change data 121 to the service component 160, wherein the updates reflect edits as they are made to the UI design under edit 125 and to the data structure representation 111 to reflect changes made by the design user to the UI design under edit 125 and to the local data structure representations 111 of the UI design under edit 125. The service component 160 can receive the change data 121, which in turn can be used to implement changes to the network-side data structure representations 161. In this way, the network-side data structure representations 161 for the active workspace files 163 can mirror (or be synchronized with) the local data structure representations 111 on the user computing device 10. When the rendering engine 120 implements changes to the UI design under edit 125 on the user device 10, the changes can be recorded or otherwise implemented with the local data structure representations 111, and the program interface 102 can stream the changes as change data 121 to the service component 160 in order to synchronize the local and network-side representations 111, 161 of the UI design under edit 125. This process can be performed repeatedly or continuously, so that the local and network-side representations 111, 161 of the UI design under edit 125 remain synchronized.

As described with examples of FIG. 1A and elsewhere, the IGDS 100 can implement the variant component logic 108, to enable a design user to create variant components. In some examples, the IGDS 100 can implement the variant component logic 108 to store newly created variant components as part of a network design library 165. When variant components are retrieved for use with a given project, the IGDS 100 can store the variant component with the UI design under edit 125. Thus, for example, a file or data set representing variant components that are in use with the UI design under edit 125 can be made a part of the working files for a given project.

Collaborative Network Platform

Figure 1C:
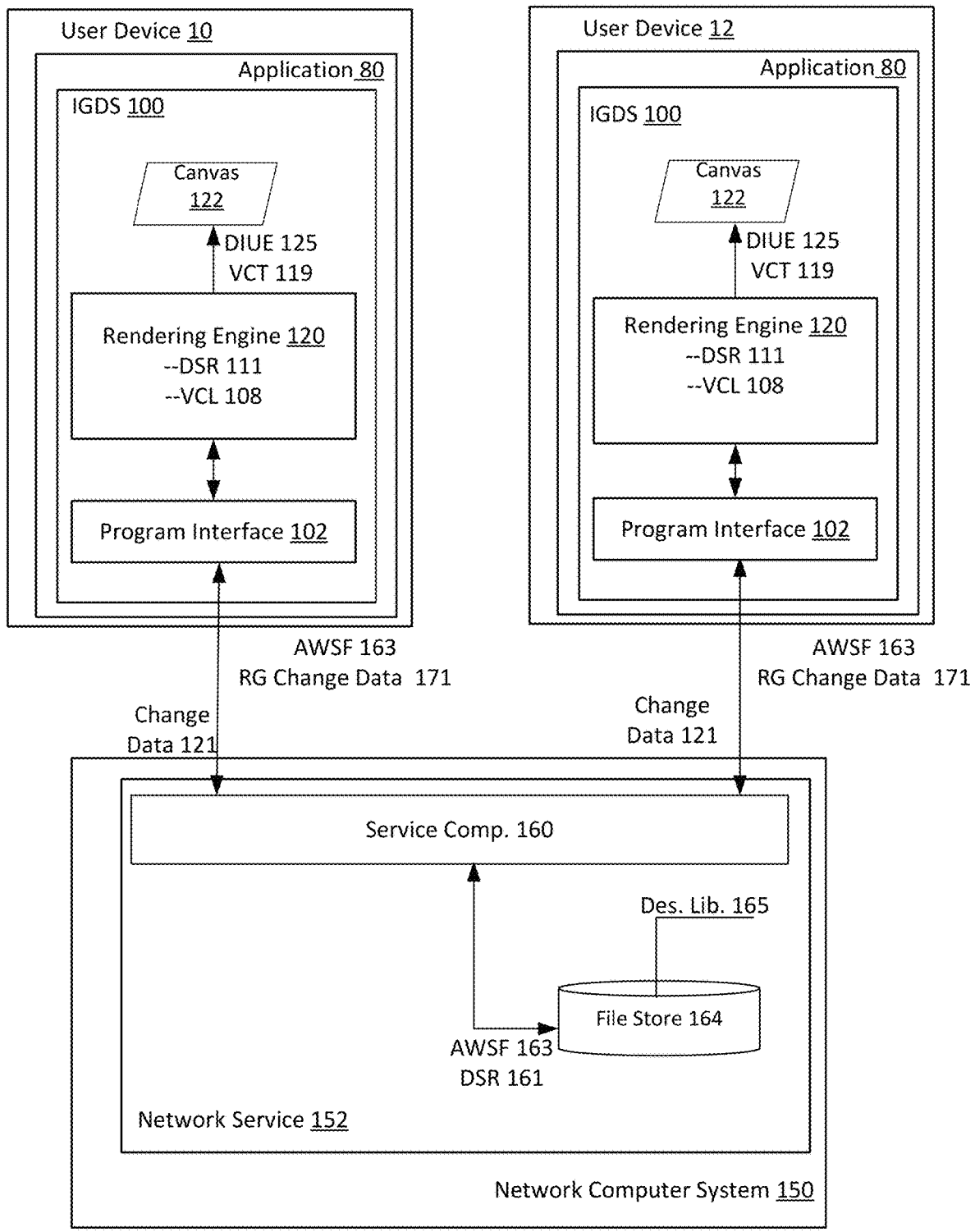
FIG. 1C illustrates a network computing system to implement an interactive graphic design system for multiple users in a collaborative network platform, according to one or more examples.

FIG. 1C illustrates a network computing system to implement an interactive graphic design system for multiple users in a collaborative network platform, according to one or more examples. In an example of FIG. 1C, a collaborative network platform is implemented by the network computing system 150, which communicates with multiple user computing devices 10, 12 over one or more networks (e.g., World Wide Web) to implement the IGDS 100 on each computing device. While FIG. 1C illustrates an example in which two users utilize the collaborative network platform, examples as described allow for the network computing system 150 to enable collaboration on design interfaces amongst a larger group of users.

With respect to FIG. 1C, the user computing devices 10, 12 can be assumed as being operated by users that are associated with a common account, with each user computing device 10, 12 implementing a corresponding IGDS 100 to access the same workspace during respective sessions that overlap with one another. Accordingly, each of the user computing devices 10, 12 may access the same set of active workspace files 163 at the same time, with the respective program interface 102 of the IGDS 100 on each user computing device 10, 12 operating to establish a corresponding communication channel (e.g., web socket connection) with the service component 160.

In examples, the service component 160 can communicate a copy of the active workspace files 163 to each user computing device 10, 12, such that the computing devices 10, 12 render the UI design under edit 125 of the active workspace files 163 at the same time. Additionally, each of the computing devices 10, 12 can maintain a local data structure representation 111 of the respective UI design under edit 125, as determined from the active workspace files 163. The service component 160 can also maintain a network-side data structure representation 161 obtained from the files of the active workspace 163, and coinciding with the local data structure representations 111 on each of the computing devices 10, 12.

The network computing system 150 can continuously synchronize the active workspace files 163 on each of the user computing devices. In particular, changes made by users to the UI design under edit 125 on one computing device 10, 12 may be immediately reflected on the UI design under edit 125 rendered on the other user computing device 10, 12. By way of example, the design user of computing devices 10 can make a change to the respective UI design under edit 125, and the respective rendering engine 120 can implement an update that is reflected in the local copy of the data structure representation 111. From the computing device 10, the program interface 102 of the IGDS 100 can stream change data 121, reflecting the change of the design user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding IGDS 100 to update the UI design under edit 125 as rendered on that device. The computing device 12 may also use the remotely generated change data 171 to update with the local data structure representation 111 of that computing device 12. The program interface 102 of the computing device 12 can receive the update from the network computing system 150, and the rendering engine 120 can update the UI design under edit 125 and the respective local copy of 111 of the computing device 12.

The reverse process can also be implemented to update the data structure representations 161 of the network computing system 150 using change data 121 communicated from the second computing device 12 (e.g., corresponding to the design user of the second computing device updating the UI design under edit 125 as rendered on the second computing device 12). In turn, the network computing system 150 can stream remotely generated change data 171 (which in the example provided, corresponds or reflects change data 121 received from the user device 12) to update the local data structure representation 111 of the UI design under edit 125 on the first computing device 10. In this way, the UI design under edit 125 of the first computing device 10 can be updated as a response to the user of the second computing device 12 providing user input to change the UI design under edit 125.

To facilitate the synchronization of the data structure representations 111, 111 on the computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data representation 161, without added data replication that may otherwise be required to process the streams from each device separately.

Additionally, over time, one or both of the computing devices 10, 12 may become out-of-sync with the server-side data representation 161. In such cases, the respective computing device 10, 12 can redownload the active workspace files 163, to restart its maintenance of the data structure representation of the UI design under edit 125 that is rendered and edited on that device.

As described with examples of FIG. 1A and FIG. 1B and elsewhere, the IGDS 100 can implement the variant component logic 108 to enable the creation, use and reuse of variant components in a collaborative network environment. In a collaborative environment as described with FIG. 1C, the IGDS 100 can implement the variant component logic 108 to enable multiple design users to concurrently, or otherwise collaboratively provide design input for creating and using variant components. In particular, the IGDS 100 can enable multiple design users to concurrently, or collaboratively provide design input to (i) create a new variant component having variants that are rendered at one time on their respective canvases 122, (ii) add variants to, or otherwise modify variant components, (iii) associate additional state properties with variant components, and assign/reassign variants to state property values (or combinations thereof).

Additionally, the layer type structure of variant components can further enable multiple users to view and work concurrently on different variants of the variant component. Each design user can also render all of the variants of the variant component at one time, so as to have an accurate view of how the variants will render when used in a real-time or production environment. With multiple collaborators, inadvertent modifications to a variant component (e.g., deleting a variant and leaving an orphaned property) can also cause the IGDS 100 to generate an error state that can be corrected by any of the collaborating design users.

Among other advantages, when a design user creates a new variant component, the IGDS 100 can generate the variant design tool 119 on a design interface 118 of each design user's computing device. Among other improvements, the creation of the variant design tool 119 can communicate to collaborators that a particular design element is logically associated with other variants, and part of a variant component. Moreover, the IGDS 100 can better manage the UI design under edit 125. For example, under conventional approaches, different design users would create different design elements for an interactive element of a functional user-interface, with little or no organization present on the respective canvases 122 to tie the design elements to the interactive element. For example, it would be tedious under conventional approaches for design users to identify a particular component that was associated with a specific state of an interactive element, particularly if the interactive element had multiple states. In a collaborative environment, the conventional approach was even more exaggerated, because design users are not necessarily familiar with all of the components that were created to, for example, represent a particular state of an interactive element. In contrast to such conventional approaches, examples enable design users to interact with the design interface 118 to filter and sort variants of the variant component based on any combination of associated properties and property values. Thus, for example, a design user can filter and sort a variant component by multiple associated properties (e.g., size, color, associated text, etc.) so that one specific variant of a much larger set of possible variants (e.g., 20 or more) is rendered on the canvas 122 for that design user.

Methodology

Figure 2A:
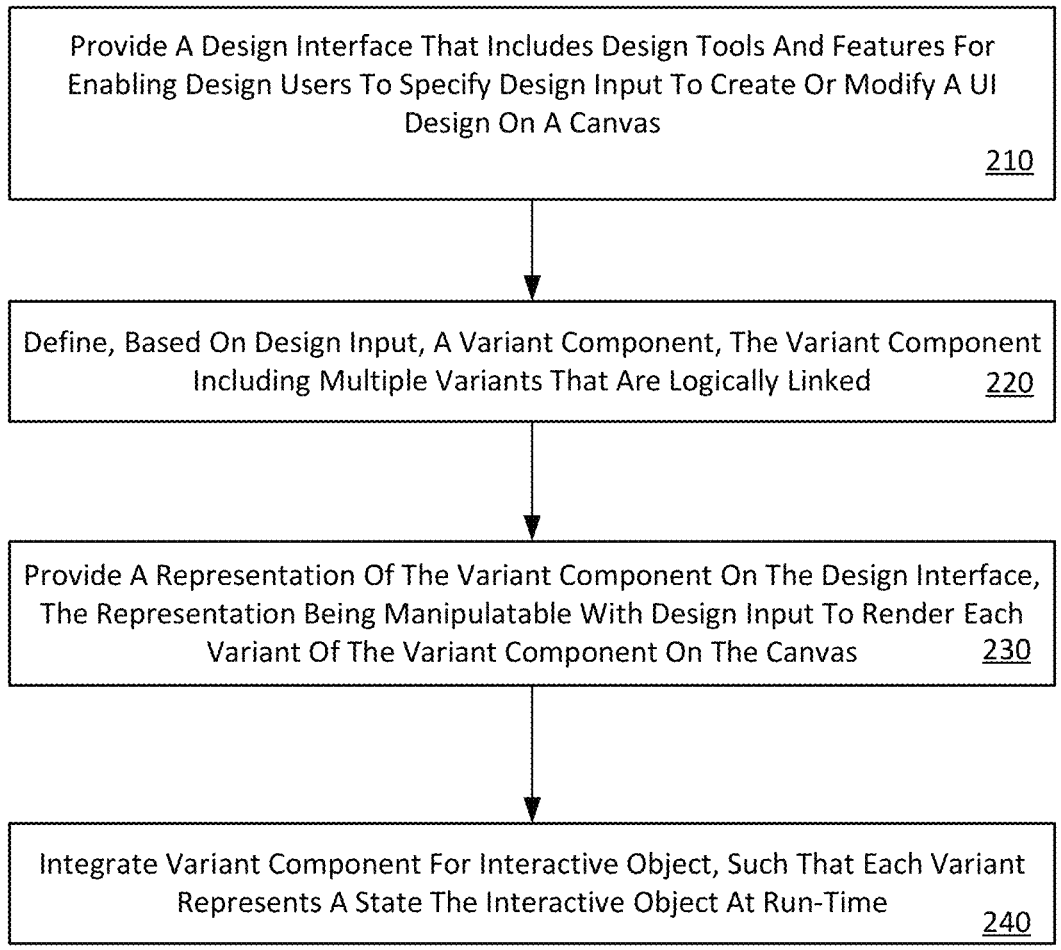
FIG. 2A illustrates an example method for implementing design interfaces utilizing variant component logic, according to one or more embodiments.
Figure 2B:
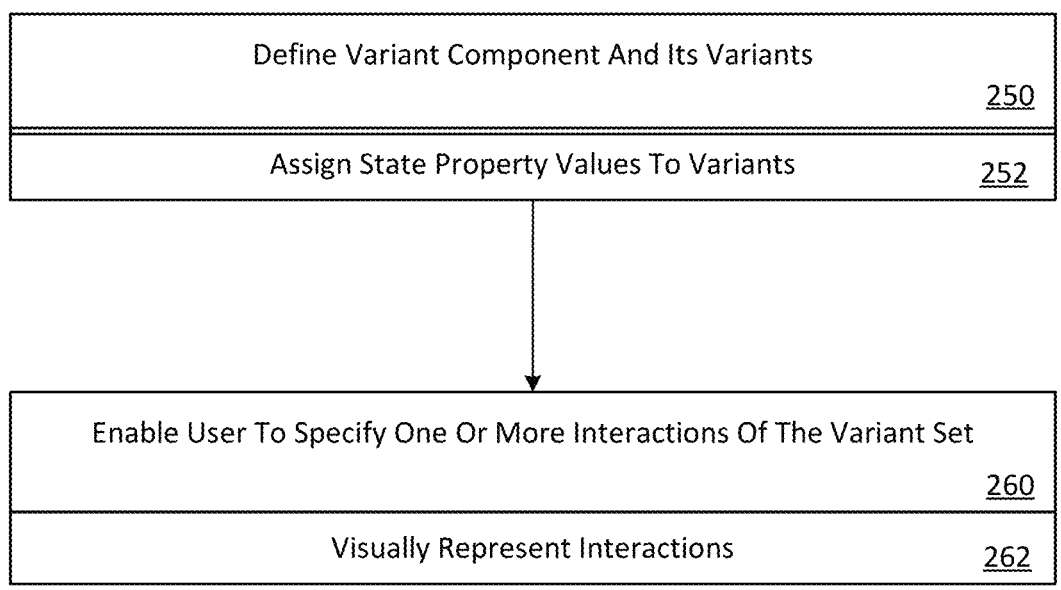
FIG. 2B illustrate an example method for implementing a design interface using a variant component set, according to one or more embodiments.

FIGS. 2A and 2B illustrate example methods for utilizing variants to represent interactive objects. Methods such as described by an example of FIG. 2A and FIG. 2B may be implemented on a user computing device that is configured to enable users to generate and edit design interfaces. For example, a method such as described by FIG. 2A and FIG. 2B may be implemented by user computing devices on which an integrated graphic design system ("IGDS") such as described with examples of FIG. 1A through FIG. 1C is implemented. Accordingly, reference may be made to elements of FIG. 1A through FIG. 1C for purpose of illustrating suitable components for performing a step or sub-step being described.

With reference to FIG. 2A, the IGDS 100 provides a design interface that includes design tools and features for enabling design users to specify design input to create or modify a UI design on a canvas of the user device (210). For example, the IGDS 100 can include design tool panels 318 (see FIG. 3A through FIG. 3E) which a design user can use to select tools and other input features for creating design elements on canvas 122.

The IGDS 100 defines a variant component based on the received design user input (220). The design user input can specify one or multiple constituent variants that are logically linked to comprise a variant component. In variations, the design user input can specify multiple portions of a single design element or object as constituent variants of a variant component.

The IGDS 100 can provide a representation of the variant component on a design interface (230). In examples, the representation can be a design tool (e.g., variant component design tool 119) that is manipulatable to enable a design user to render any or all of the variants of the variant component. In some examples, the design interface can also include a panel or other feature that identifies the properties associated with the variant component, as well as the respective property values that are assigned to each of the variants. In this way, the design users can filter and sort variants which are rendered on their respective canvas using selection of properties and property values.

In examples, the IGDS 100 integrates the variant component into an interactive run-time component (e.g., such as part of a functional user-interface or simulation), such that each state of the interactive object is represented by one of the variants of the variant component (240). The interactive element of the variant component can be responsive to a corresponding event to transition amongst multiple states. As described by examples, each of the multiple states can correspond or otherwise be based on one of the multiple constituent variants.

With reference to FIG. 2B, a design user can interact with the IGDS 100 to define a variant set (250). For example, the user can define design elements rendered on a canvas as variants of a variant set (or "variant component" or "variant component set"), or the user can interact with a tool to specify design elements that are to be variants for a variant component.

In defining a variant set, the user can interact with the IGDS 100 to specify a state property (or state properties) and state property value (or state property values) for each of the variants (252). Alternatively, the state property and state property value (or state properties and state property values) can be automatically determined, based on, for example, a comparison of the properties of design elements that are variants. The state property or properties may be selected to have varying respective values amongst the variants, such that each variant corresponds to one state property value or combination of state property values. In this way, each variant represents a state of the represented interactive object.

Figure 5A:
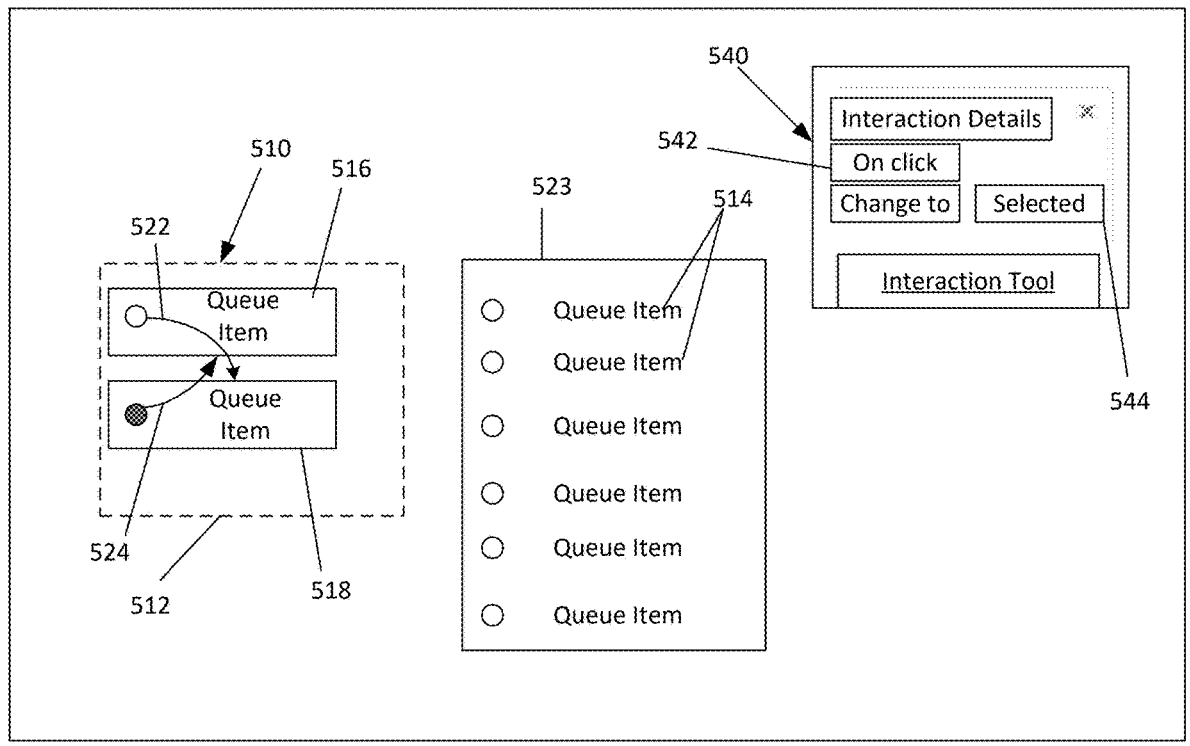
FIG. 5A illustrates an example design interfaces that utilize variant sets, according to one or more embodiments.

Further, the IGDS 100 enables the user to specify one or more interactions for the variant set (260). In examples, each interaction of the variant set is defined to specify a first variant (e.g., or initial or current variant) that is to change to a second variant (e.g., target or next variant) of the variant set. In such cases, each interaction that is defined for the variant set can have a respective first/second variants of the variant set, such that a variant set can have interactions with different first/second variants. In some examples, interactions may also be defined to be specific to a trigger event. For example, the user can specify individual interactions for a specific first/second variant of a variant set, and further in association with a specific type of event (e.g., run-time click or hover). As shown by FIG. 5A and FIG. 5C, in some examples, interactions can be visually rendered as noodles or line connectors that identify a sequence as between variants, where the sequence corresponds to a state flow for the represented run-time object (262). Further, the interactions can be associated on the canvas with an event type (e.g., trigger, input type) and other characteristics which further define the state flow for the interactive object.

In some examples, the IGDS 100 can implement a run-time rendering of the user object changing states in accordance with the one or more defined interactions of the variant component.

Examples

FIG. 3A through FIG. 3F illustrate examples for use with a design interface of an interactive graphic design system ("IGDS") such as described with examples of FIG. 1A through FIG. 1C, in accordance with one or more examples. In particular, FIG. 3A through FIG. 3F illustrate a design interface that is generated by the IGDS 100 implementing logic to enable design users to create, modify, use and reuse variant components. In describing FIG. 3A through FIG. 3F, reference may be made to elements of FIG. 1A through FIG. 1C for purpose of illustrating components for implementing functionality being described.

With reference to FIG. 3A through FIG. 3F, the IGDS 100 can implement variant component logic 108 to provide a design interface 300 that includes a canvas 302 on which a user-interface (UI) design under edit 305 can be rendered. The design interface 300 includes one or more design tool panels, shown as a layer panel 318A and a properties panel 318B (collectively "design tool panels 318"), that provide various types of design tools and functionality for creating the UI design under edit 305. In some examples, a design user can use features of design tool panels 318 to create one or more design elements (e.g., component) that in turn, can be logically linked to form constituent variants of a variant component 310. Alternatively, the design user can select one or more existing design elements 304, 306, 308 on the canvas 302 to comprise the variant component 310. Additionally, design users can retrieve variant component 310 from a local or network design library. Once retrieved, the variant components 310 and its constituent variants can be modified on the canvas 302.

Creation of a Variant Component

Figure 3A:
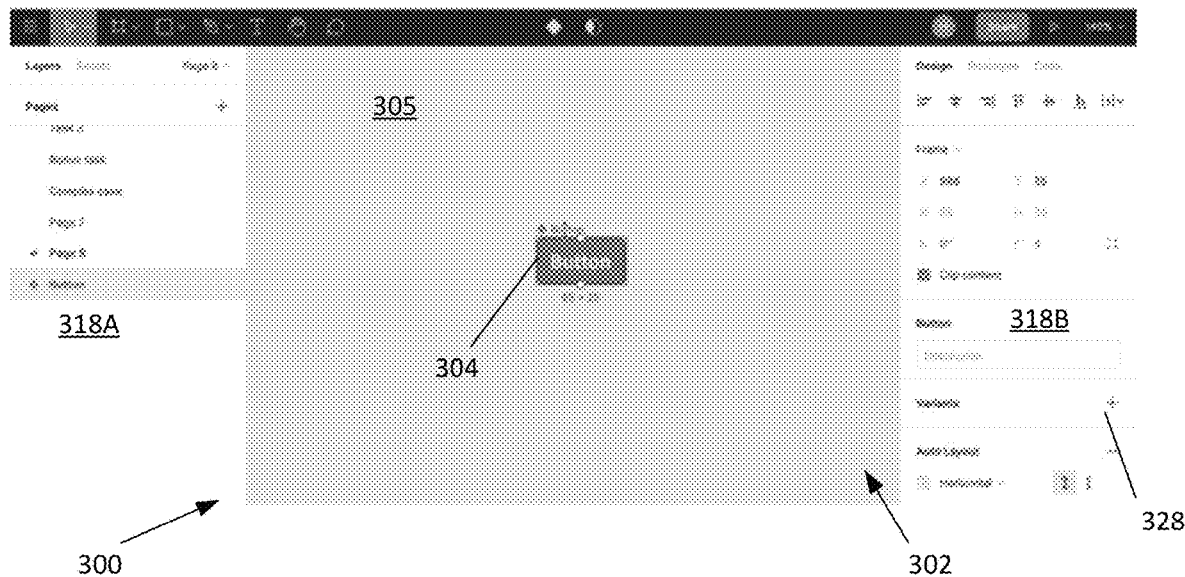
FIG. 3A through FIG. 3F illustrate examples of interactive graphic design system ("IGDS") implementing variant component logic, according to one or more embodiments.
Figure 3B:
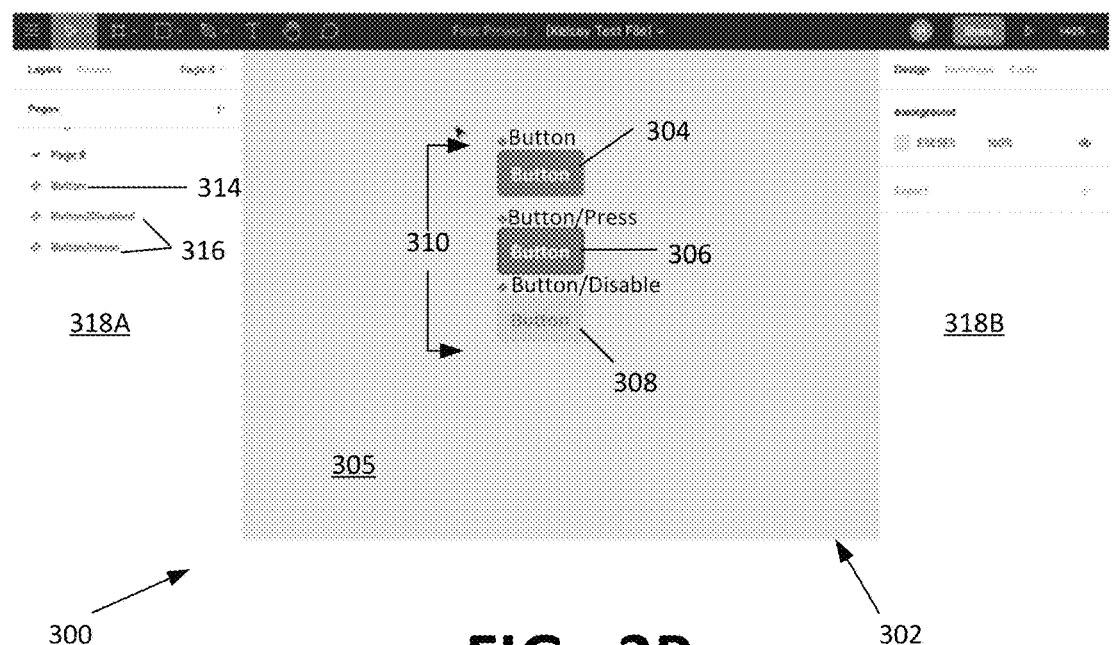

FIG. 3A and FIG. 3B illustrate creation of a variant component, according to one or more examples. The design tool panels 318 can include a variant component creation feature to designate design elements as variants. In a scenario illustrated by FIG. 3A, a first design element 304 rendered on canvas 302 can be designated as a variant of variant component 310 using the variant component creation feature 328. When the variant component creation feature 328 is used in this manner, the first variant 304 is logically linked to the variant component 310 (or all other variants of the variant component 310). The design interface 300 can prompt or otherwise enable the user to specify a second variant 306 as another constituent of the variant component 310.

As an addition or variation, the design user can select multiple design elements for a variant component 310 at one time. For example, the user can use the variant creation tool 328 to select design elements 304, 306 at one time. In response, the IGDS 100 logically links the design elements 304, 306, such that each of the design elements 304, 306 is a variant of the variant component 310. In this way, the IGDS implements the variant component logic 108 to enable design users to select rendered design elements as variants for a variant component 310.

As shown with FIG. 3B, the user can add additional design elements (represented by design element 308) to the variant component 310, by, for example, creating an instance off of another variant, then specifying a state property value that corresponds to one of the desired states for the interactive object. The IGDS 100 implements the variant component logic 108 to logically link the variants 304, 306, 308 as constituents of the variant component 310. In particular, the IGDS 100 can implement variant component logic 108 to (i) associate at least one property with the variant component 310, where the state property includes multiple possible property values; (ii) assign one of multiple possible state property values to each variant of the variant component, such that each variant has a unique state property value amongst all of the variants of the variant component; and (iii) specify a sequence and event type amongst the variants to define a state flow of the interactive object (see FIG. 5A and FIG. 5C). In this way, the user can define the state flow for an interactive object using design elements that are rendered at one time on the canvas 302.

In variations, the IGDS 100 can further implement the variant component logic 108 to implement additional functional aspects relating to the user of variants. For example, the IGDS 100 can structure the variant component 310 as a layer type, with each of the variants 304, 306, 308 being one of the layers variant component. Additionally, the IGDS 100 can enforce assignment of each variant 304, 306, 308 to only one state property value of the associated state property. As described, each state property value can represent or correlate to a state or version of an interactive element of a functional interactive object or user-interface.

In some variations, the variants 306, 308 are dependent components of a main component (e.g., shown by design element 304), and the IGDS 100 can implement operation duplication logic with respect to how design input is received and implemented for the variant component 310. Specifically, the operation duplication logic can provide that design input received for the variant 304 (representing the first (or main) component) is automatically propagated to the variants 306, 308 (representing the instance components). Based on implementation, changes made to either one of the variants 306, 308 is not automatically duplicated to the main component or the other instance component(s).

When a variant component 310 is created, each of its variants 304, 306, 308 is assigned a state property value that can correspond to a specified state or version of an interactive object of a functional user-interface. Thus, for example, the state property value can represent the field value that a run-time program will use in calling the design element associated with a particular state of the functional interactive object. In FIG. 3B, the variant component 310 may be associated with the state property "Button" and the set of possible state property values can include "default", "press" and "disabled". The IGDS 100 can implement the variant component logic 108 to prompt the design user to provide the state property values for each constituent variant 304, 306, 308 of the variant component 310. As an addition or alternative, the IGDS 100 can implement the variant component logic 108 to automatically determine the state property value that is to be assigned to each constituent variant 304, 306, 308. For example, the initial variant 304 can be designated the state property value of "default", and the variants 306, 308 can be assigned a state property value based on the order (e.g., top-to-bottom, left-to-right) in which the particular design element appears in connection with other constituent variants 306, 308 of the variant component 310. In this way, the constituent variants 304, 306, 308 of the variant component 310 can be logically sequenced and matched to a corresponding ordering of state property values for an associated state property of the variant component 310.

When a variant component 310 is defined or called for use with the UI design under edit 305, a graphic representation 314 of the variant component 310 can be provided on one of the design tool panels 318 (e.g., the layer panel 318A). The representation 314 can be functional, such as described with variant design tool 119. For example, the representation 314 may be selectable to render the variant component 310 on the canvas 302. When the representation 314 is selected, the IGDS 100 renders each constituent variant 304, 306, 308 of the variant component 310 at the same time on the canvas 302. In examples, the representation 314 can also include separate sub-indicators 316, each of which is selectable to render (or stop rendering of) a corresponding variant 304, 306, 308. Thus, each sub-indicator 316 can identify each constituent variant 304, 306, 308 of the variant component 310. In this way, the sub-indicators 316 can be selected individually or in combination, as layers, to render one or more of the constituent variants 304, 306, 308 of the variant component 310.

Naming Convention

In examples, the IGDS 100 can implement a layer-type naming scheme to identify the variant component 310 and its constituent variants 304, 306, 308. The naming scheme can structure a name for each constituent variant 304, 306, 308 to identify the state property and the state property value of that component. In examples, the name of individual constituent variants 304, 306, 308 can, for example, be structured in the form of "property/property value". The IGDS 100 can enable the design user to specify the state property value for any one of the constituent variants 304, 306, 308 through the naming scheme. For example, the design user can name individual variants 304, 306, 308 using the naming scheme, which in turn can be used to designate the state property value of the respective constituent variant. As an addition or variation, the IGDS 100 can auto-generate the names of each variant 304, 306, 308 by determining the state property value of each of those components. For example, the design user can interact with the design tool panels 318 to specify the state property value of one or more constituent variants 304, 306, 308 of the variant component 310, and in turn, the IGDS 100 can auto-generate the name for each of those components using the naming scheme (e.g., "property/property value").

In examples, the representation 314 of the variant component 310, and the sub-indicators 316 of the constituent variants 304, 306, 308 can reflect the respective names of the variant component 310 and its constituent variants 304, 306, 308. The sub-indicators 316 can also be visually structured to reflect a sequence or stacking of the constituent variants 304, 306, 308.

Figure 3C:
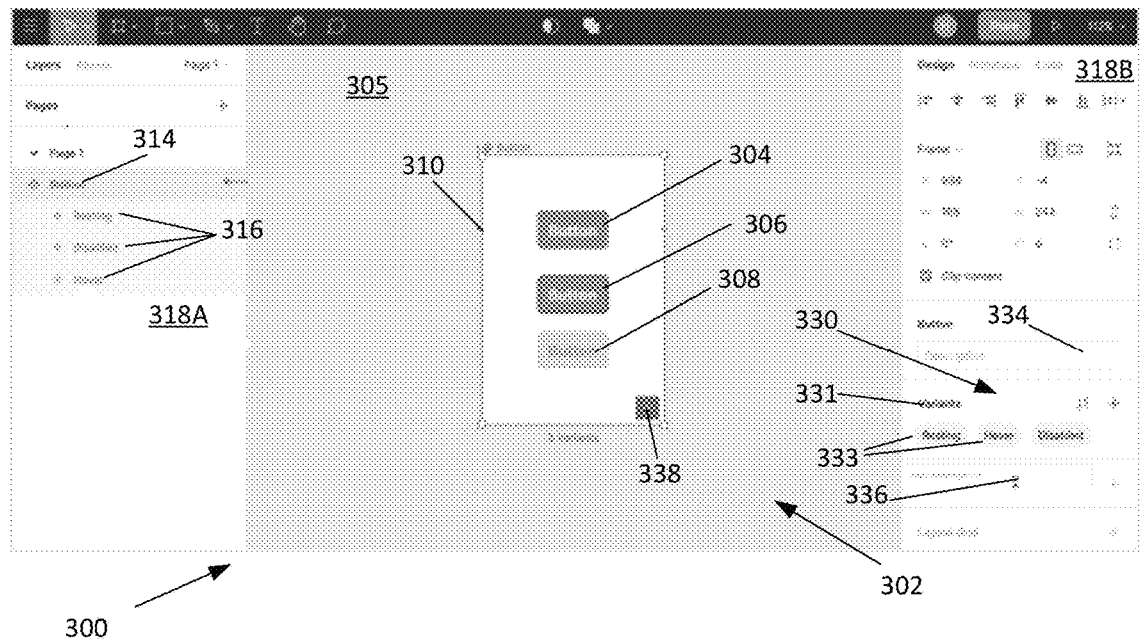

FIG. 3C illustrates the variant component 310 rendered on the canvas 302. For example, the IGDS 100 can respond to design input in which the representation 314 is selected by rendering all of the variants 304, 306, 308 of the variant component 310. As shown, the variant component 310 can be selected for rendering on the canvas 302, and when selected, each constituent variant 304, 306, 308 of the variant component 310 is rendered at same time. Alternatively, the design input can select sub-indicators 316 to select which of the variants 304, 306, 308 are viewable on the canvas 302. The design user can then provide additional design input to modify or update the variant component 310 and/or its variants 304, 306, 308.

When the variant component 310 is rendered, the IGDS 100 can provide a property sub-panel 330 for the variant component 310. The property sub-panel 330 can include (i) a property indicator 331 (e.g., "button") of the variant component 310, identifying the state property associated with the variant, and (ii) the state property value 333 of the indicated property (e.g., "resting", "hover", and "disabled") for each of the constituent variants 304, 306, 308.

Commenting Fields

With further reference to an example of FIG. 3C, the IGDS 100 can include commenting features 334, 336 to enable commenting by one or multiple design users who collaboratively contribute to the UI design under edit 305. The variant commenting feature 334 can, for example, be provided as part of the properties panel 330 to enable a design user to specify comments about the variant component 310. Additionally, a property commenting feature 336 can be provided with each state property to enable one design user to communicate information about the state property values of a corresponding state property. In this way, the commenting features 334 can be associated with the variant component 310, and further rendered as a part of one of the design tool panels 318 when the variant component 310 is in use. Furthermore, the commenting features 334, 336 can be provided in context, so that comments pertaining to the variant component 310 as is readily identifiable and separate from the commenting feature about the variants and associated state properties.

Examples recognize that variant components 310 are reusable—meaning they can be stored as part of the design library, and further retrieved and incorporated with the UI design under edit 305 as needed. Moreover, in a collaborative environment, the variant component 310 can be constructed by multiple design users at different times. The commenting features 334, 336 can enable design users to communicate important information to other design users about the variant component 310 and its constituents, facilitating the propagation and use of the variant component 310 over time with many projects.

Figure 3D:
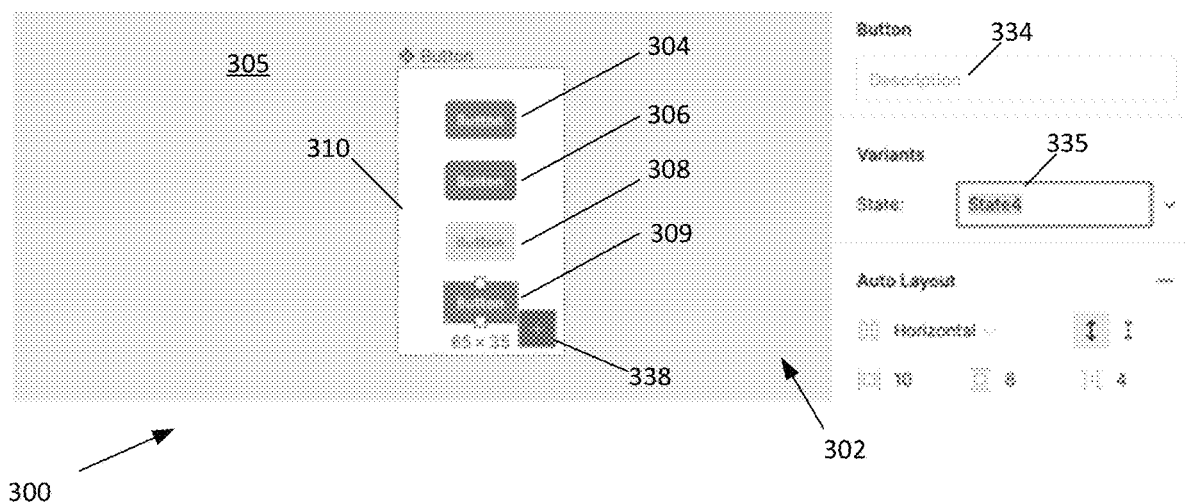

FIG. 3D illustrates the IGDS 100 implementing the variant component logic 108 to add a constituent variant 309 to the variant component 310. In examples, the design user can interact with, for example, a variant add feature 338 to cause the IGDS 100 to link the additional variant 309 to the variant component 310.

When a new variant 309 is added, the IGDS 100 can prompt the user to specify the state property value for the component. For example, the property panel 330 can include a property value field 335 that the design user can interact with to specify or select a state property value for the newly added constituent variant 309. In examples, the IGDS 100 can prompt the design user (e.g., via the property value field 335) to specify the name of the newly added variant 309. For example, the property field value 335 of the newly added variant 309 can be automatically placed in edit mode, to enable the design user to specify the state property that variant. In examples, the IGDS 100 also uses the variant component logic 108 to implement the naming scheme to automatically generate a name and sub-indicator 316 for the newly added variant 309 using, for example, the state property name and specified state property value for that component.

Enforcement

In examples, the IGDS 100 implements the variant component logic 108 to enforce rules regarding the assignment of state property values to variants 304, 306, 308 of the variant component 310. The enforcement can, for example, enforce a rule where each variant 304, 306, 308 is assigned to only one state property value of the state property associated with the variant component 310, such that each state property value is assigned to only one variant of the variant component 310. Accordingly, each newly added variant can be assigned to an available state property value of an associated state property of the variant component 310. In some examples, if all existing state property values of the associated state property are assigned to other constituent variants of the variant component 310, the IGDS 100 can create a new state property value that is assigned to the newly added constituent variant.

Additionally, in some variations, if a constituent variant 304, 306, 308 of the variant component 310 is deleted, the IGDS 100 can cause the UI design under edit 305 to be in an error state. In the error state, the IGDS 100 can, for example, generate a message to warn the user that at least one of the state property values of the associated state property for the variant component 310 is not assigned to a constituent variant of the variant component 310. The error state of the UI design under edit 305 can be removed once the design user either deletes an appropriate number of state property values or adds an appropriate number of variants to the variant component 310. Still further, in some variations, if one of the constituent variants 304, 306, 308 is deleted such that one state property value of the associated state property is left available, the IGDS 100 can reset the state property values of the remaining constituent variants. The IGDS 100 can further maintain the error state of the UI design under edit 305 until each state property value of the associated state property is assigned to one variant 304, 306, 308, 309 of the variant component 310.

Multi-Dimensioned Variant Components

Figure 3E:
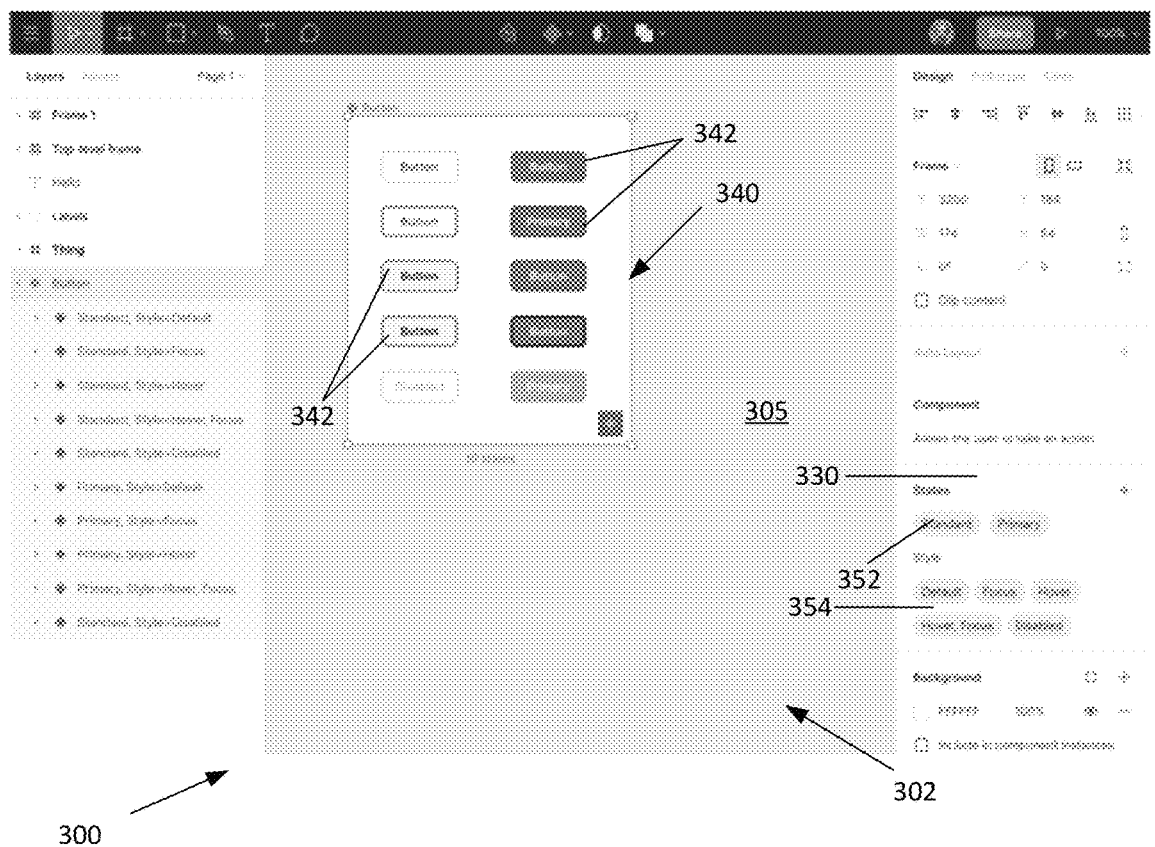

FIG. 3E illustrates an implementation in which a variant component is multi-dimensional, according to one or more examples. In examples, a multi-dimensional variant component 340 can include multiple state properties, with each state property having a set of possible state property values. When all combinations of state property values are considered for the multiple associated state properties, each variant is assigned to only one combination of state property values, such that each combination of state property values is represented by only one variant. The state properties and the state property values can include respective indicators 352, 354, provided with, for example, the property panel 330, as part of the design interface 318. The indicators 352, 354, can enable the design users to filter and sort which variants 342 of the variant component 340 are rendered. Thus, for example, individual design users can select any combination of state property values to view the corresponding variants that correspond to the selection of property values. Additionally, the indicators 352 for the associated state property, as well as the indicators 354 for the possible state property values can include menu features to enable the design users to select state property values for variants, and/or to reassign or create new state property values.

In examples, the naming scheme for constituent variants 342 of the multi-dimensional variant component 340 can be extended from the naming scheme used for the single dimension variant component 310. For example, each constituent variant 342 can have a naming scheme in the form of "property/propertyvalue1/propertyvalue2". The IGDS 100 can also implement a priority or order amongst the multiple state properties.

In examples, a multi-dimensional variant component 340 can be created by adding a state property to a single dimension variant component. A property feature (not shown) can be provided with the design tool panels 318 to enable the design user to add a new state property to an existing variant component. The design user can then add state property values to the newly defined state property value. The state property values can be specified through a property sub-panel 330, and subsequent variants 342 of the variant component 340 can be generated and assigned to newly defined state property value combinations. As an addition or variation, new constituent variants 342 can be added to the multi-dimensional variant component 340, and the IGDS 100 can prompt the design user to name the newly added components to reflect state property values of the newly added state property. More generally, new state property values can be created for a particular state property as a result of the design user creating new variants 342 for the variant component 340, and also specifying new state properties for one or more of the defined state properties associated with the multi-dimensional variant component 340.

Figure 3F:
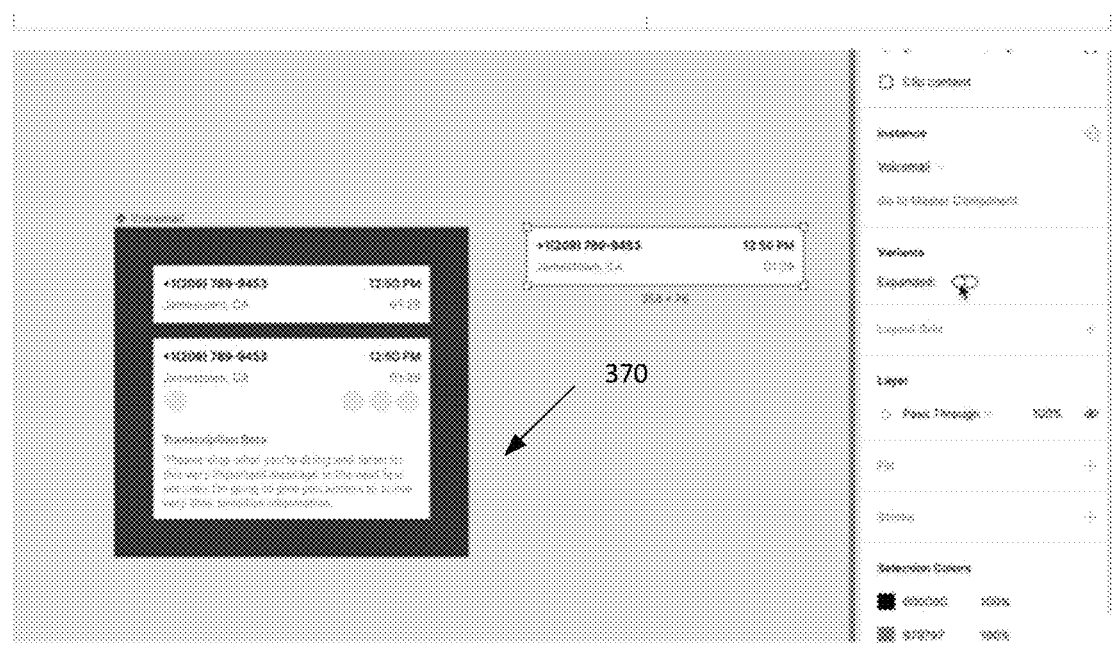

FIG. 3F illustrates another variation of a variant component, according to one or more examples. In an example of FIG. 3F, a variant component 370 can include a single design element (e.g., social media posting), and the constituent elements of the variant component 370 can correspond to different portions of the variant component 370. For example, the constituent element(s) can include multiple resources (e.g., text, image, video) of a content item, and the constituent element(s) can reflect different portions of the content item. In some examples, the state property for such variant components 370 can have binary state property values (e.g., "expanded/contracted"; "on/off" etc.).

In reference to FIG. 3A through 3F, examples provide that the UI design under edit 305 can be incorporated into a program to provide design elements of a functional user-interface. As described by various examples, the functional user-interface can generate an interactive element that is based on the variant component. The interactive element can be responsive to a corresponding event to transition amongst multiple states, where the appearance of the interactive element changes from state-to-state with respect to at least one state property value. In examples, each variant of individual variant components can be associated with at least one state property having a state property value that is unique amongst the group of constituent variants of the variant component 310. In this way, each of the different states of the interactive element generated at run-time are based on one of the variants of the corresponding variant component.

Figure 4A:
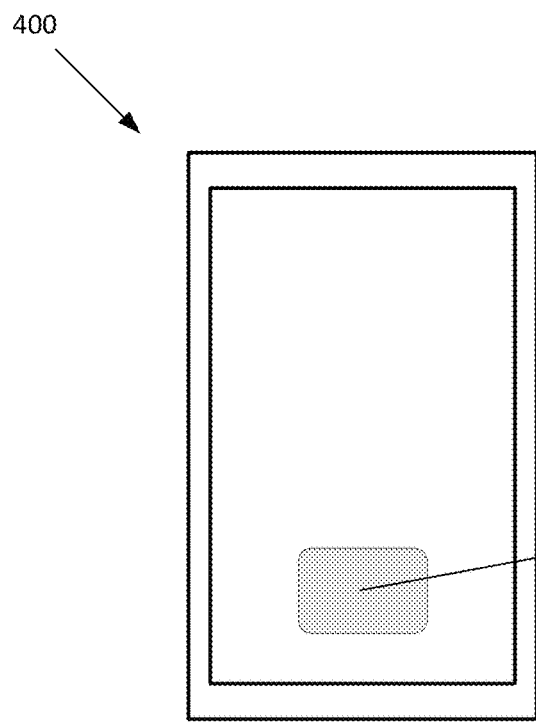
FIG. 4A through FIG. 4C illustrate an example run-time object that is implemented through use of a variant component, in accordance with one or more embodiments.
Figure 4B:
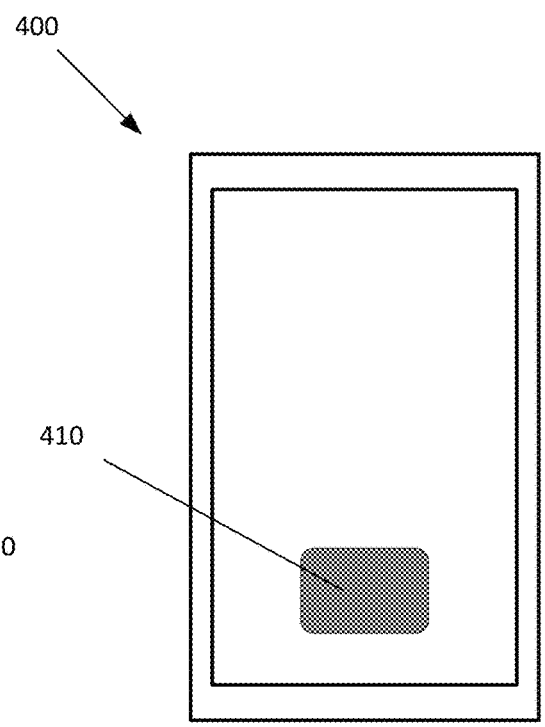
Figure 4C:
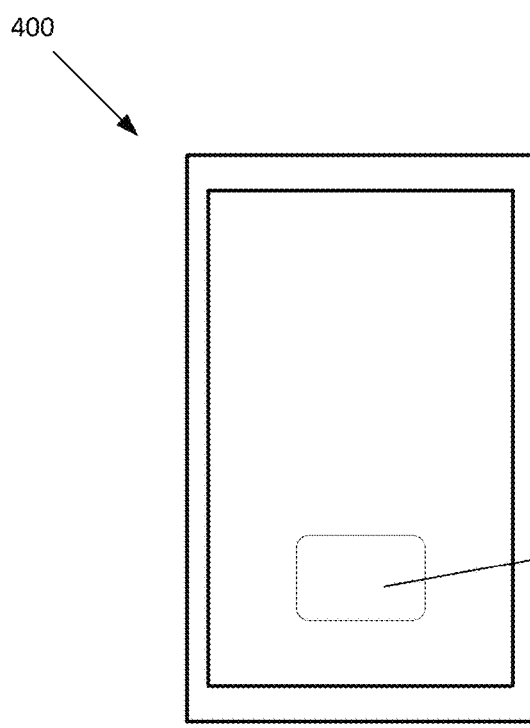

FIG. 4A through FIG. 4C illustrate an example run-time interactive object or user-interface that can be generated using a design interface that is created with implementation of variant component logic 108 such as described with examples of FIG. 3A through FIG. 3E. In particular, examples illustrated with FIG. 4A through FIG. 4C illustrate an example run-time object 410 or user-interface generated from a single dimension variant component 310, as shown with FIG. 3A through FIG. 3C. In variations, the run-time object 410 can be recreated during a design phase, by the IGDS 100, using a prototype or run-time simulation logic.

In an example of FIG. 4A through FIG. 4C, a mobile computing device 400 executes an application (e.g., "app") that generates a user-interface having a run-time object 410, shown as a button feature (e.g., soft-button or virtual button). Accordingly, the run-time object 10 is an interactive multi-state feature that is responsive to events that include, for example, user contact, and/or commands signaled over a network or generated internally. The application can execute on the mobile device 400 to implement multiple states, where each state of the run-time object 410 is defined by a variant of the variant component 310. In an example of FIG. 4A, the run-time object 410 is shown in a default state, represented by a corresponding default variant 304.

In an example of FIG. 4B, the run-time object 410 is in a selected or pressed state, corresponding to a state represented by the variant 306 of the run-time object 410. In this state, the appearance of the run-time object 410 differs in accordance with the change in the state property value of the variant 306. For example, the state property value can reflect a color, fill pattern, or other characteristic that provides visual feedback of a button press for the end user.

In an example of FIG. 4C, the run-time object 410 is shown in a disabled state, meaning the functionality provided through that feature is not available to the user. The appearance of the run-time object 410 may further differ from that of the default state so that the user is given a visual indication that the functionality associated with the run-time object 410 is not available. With further reference to FIG. 4C, the run-time object 410 in the pressed state can be generated from the constituent variant 306 of the state component 310 that is assigned the state property value of "disabled".

FIG. 5A illustrates an example design interfaces that utilize variant sets, according to one or more examples. With reference to FIG. 5A, a variant set 510 can be created on a canvas 502, as part of a design under edit by the IGDS 100. The variant set 510 can include a container 512 and one or more variants 516, 518 that comprise constituents of the variant set 510. In examples, a user can specify one or multiple interactions with the constituent variants, where each interaction identifies a desired state change for a run-time object that is represented by the variant set 510.

In examples, each interaction of the variant set 510 is defined to specify a current or first (in time) variant that is to change to a next or second (in-time) variant of the variant set 510. With reference to FIG. 5A, a design user can specify a first interaction 522 in which a corresponding first variant 516 changes to a second variant 518, in response to a particular type of input event (e.g., "hover" or "click" input). Likewise, a second interaction 524 can provide the reverse effect (i.e., first-in-time variant 518 changes to the second-in-time variant 516). Each interaction 522, 524 can also be associated with an event type (e.g., "click" or "hover"), where the event type represents an event (e.g., end user clicks or hovers over run-time object) that triggers a run-time object to change states in a manner that is represented by the specified interactions 522, 524 of the variant set 510.

In examples, each of the interactions 522, 524 can be graphically defined by the user. The user can draw or otherwise create line connectors or "noodles" to define each interaction. In this form, the interactions 522, 524 can have a directional aspect, to indicate a sequence of the state flow for the represented run-time object. For example, the interaction 522 starts at the variant 516 and ends at the variant 518, meaning the represented object is to transition from a state represented by the variant 516 to a state represented by the variant 518. The interaction 522 can further be associated with an event type, such as a type of user input, that is to cause the state transition. In examples, the user can interact with a design tool 540 to specify characteristics of the interaction 522, such as a feature 542 to specify the event type (e.g., "on-click") to trigger the represented state transition, and a feature 544 to specify the value of the state property that is to change as a result of the transition. Likewise, the interaction 524 starts at the variant 518 and ends at the variant 516, meaning the represented object is to transition from a state represented by the variant 518 to a state represented by the variant 516. The design user can further interact with the features 542, 544 of the design tool 540 to specify characteristics of the interaction 524, including the input type or event that is to trigger the reverse transition, as well as the value of the state property that is to change as a result of the transition.

While an example of FIG. 5A is simplified to illustrate a variant set 510 that includes two variants, defining two states (e.g., "selected and unselected) of an interactive object, in other cases, the variant set 510 can include numerous variants. Furthermore, in some cases, the interactive object can be defined by multiple varying state property values. Thus, the variants 516, 518 of the variant set 510 may be defined by multiple state property values that are variable, where each variant 516, 518 of the variant set has a unique combination of the state property values so as to define one of the multiple possible states. In such examples, numerous interactions may be possible from a single variant. For example, a variant can be associated with multiple interactions, where each interaction leads to a different variant having a unique combination of state property values. For example, a default variant can have (i) a first interaction that specifies a first type of user input (e.g., "click") that results in a first variant (that is different than the default variant), and (ii) a second interaction that specifies a second type of user input (e.g., "drag") that results in a second variant (that is different than the default and first variants). In the latter example, each of the first, second and third variant has a unique (amongst the corresponding variant set) combination of state property values.

Accordingly, each of the variants 516, 518 represent a state of a corresponding run-time object 536. The run-time object 536 can be executed (e.g., such as in a simulation or prototype environment) to exhibit a run-time behavior that is defined by the variants 516, 518 of the variant set 510, as well as the specified interactions 522, 524 of the variant set 510.

Among other advantages, examples as described allow for the variants 516, 518 of the variant set 510 to be rendered at the same time, along with the interactions 522, 524, so that the states and state change behaviors of a run-time object are visually represented at the same time.

With further reference to an example of FIG. 5A, a variant set 510 can be created from a main component 525 to a component set 523, where the main component 525 defines a set of properties for that component and its instances 526. The IGDS 100 can implement logic where each instance of the component set 523 is automatically updated to reflect any changes made to the main component 525. To create the variant set 510, the user may create separate instances of the main component 525, shown by variants 516, 518. The variant set 510 can then be linked to the main component 525, meaning the variant set 510 is also automatically linked to each instance 526 of the component set 523.

Figure 5B:
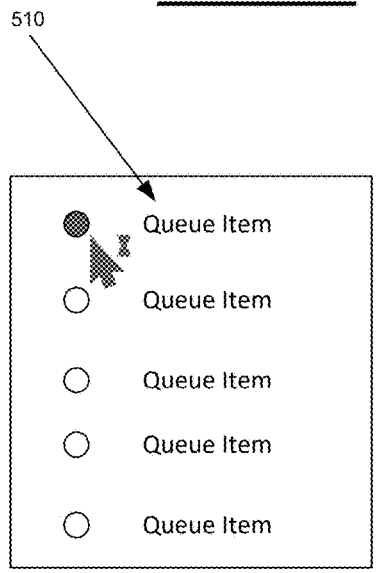
FIG. 5B illustrates interactive components which can be formed from a variant set shown in FIG. 5A, according to one or more embodiments.
Figure 5C:
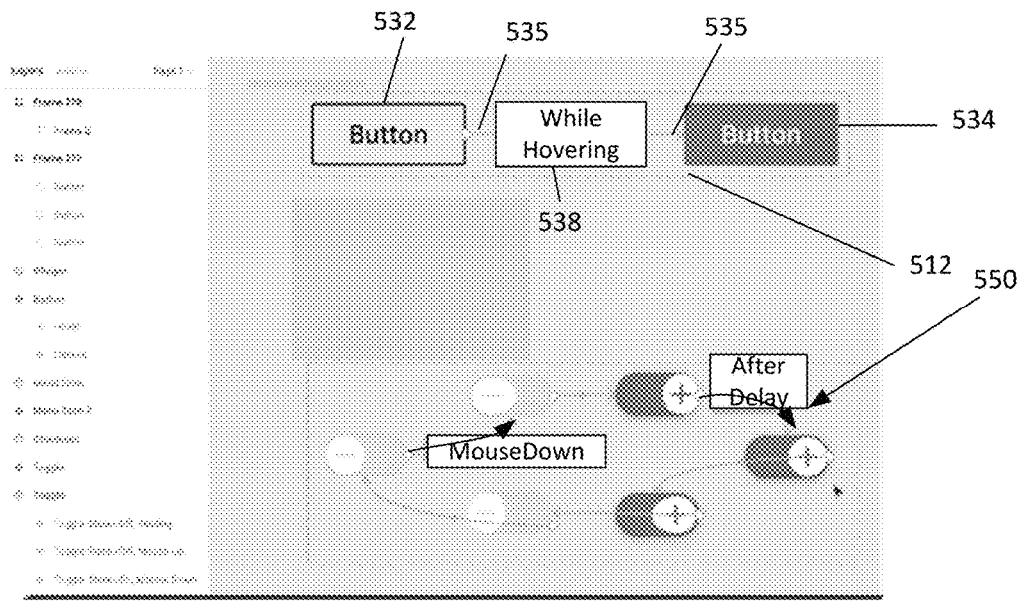
FIG. 5C illustrates additional examples of variant sets, according to one or more embodiments.

FIG. 5B illustrates interactive components which can be formed from the variant set 510 of FIG. 5A. In particular, the variant set 510 can be defined for the main component 525 of a component set 523, such that the variant set 510 is used to define the states of each instance 526 of the main component 525. Accordingly, in an example of FIG. 5B, each queue row item can be represented by the variant set 510.

FIG. 5C illustrates additional examples of variant sets. A first variant set 530 can include variants 532, 534 that represent alternative states of an object (e.g., button). A noodle or line connector 535 can represent an interaction, reflecting a first-in-time (or first) variant and a second-in-time (or second) variant for the interaction. In examples, the noodle 535 can also represent or otherwise indicate a type of event 538 (e.g., "hover") to cause the run-time object to change to a state represented by the second variant 534. A reverse connection, or alternative connections and variants can also be provided to define additional state transitions for the interactive object.

Figure 5D:
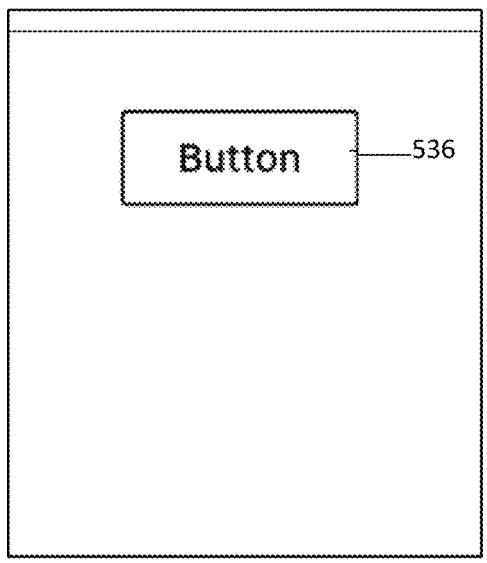
FIG. 5D and FIG. 5E illustrates a run-time object which executes to exhibit a behavior defined by a variant set of FIG. 5C, according to one or more embodiments.
Figure 5E:
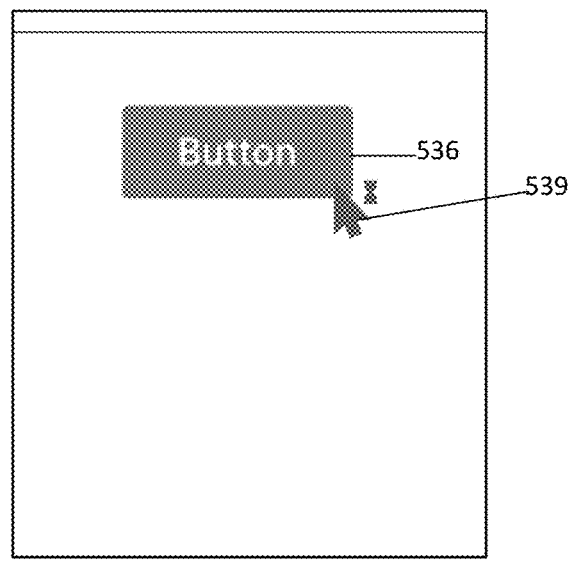

FIG. 5D and FIG. 5E illustrates a run-time object 536 which executes to exhibit a behavior defined by the variant set 530. The run-time object 536 can include a default state, shown by FIG. 5D, which corresponds to the variant 532. In response to an interaction (hovering pointer 539) as specified by noodle 535, the run-time object 536 changes states, shown by FIG. 5E. The change in state of the run-time object 540 is defined by the variant 532, 534 and the interaction represented by the noodle 535. The change in state of the interactive object can be reflected by a variation between the variants 532, 534 of a state property value (e.g., color).

With further reference to FIG. 5C, examples enable a user to create numerous types of variant sets 550 each of which can include noodles or other visual indicators of interactions between variants of the respective sets 550, 560. The interaction represented by each noodle can reflect different types of input actions and events to cause the run-time object to change state, such as "mouse down" or "delay".

Network Computer System

Figure 6:
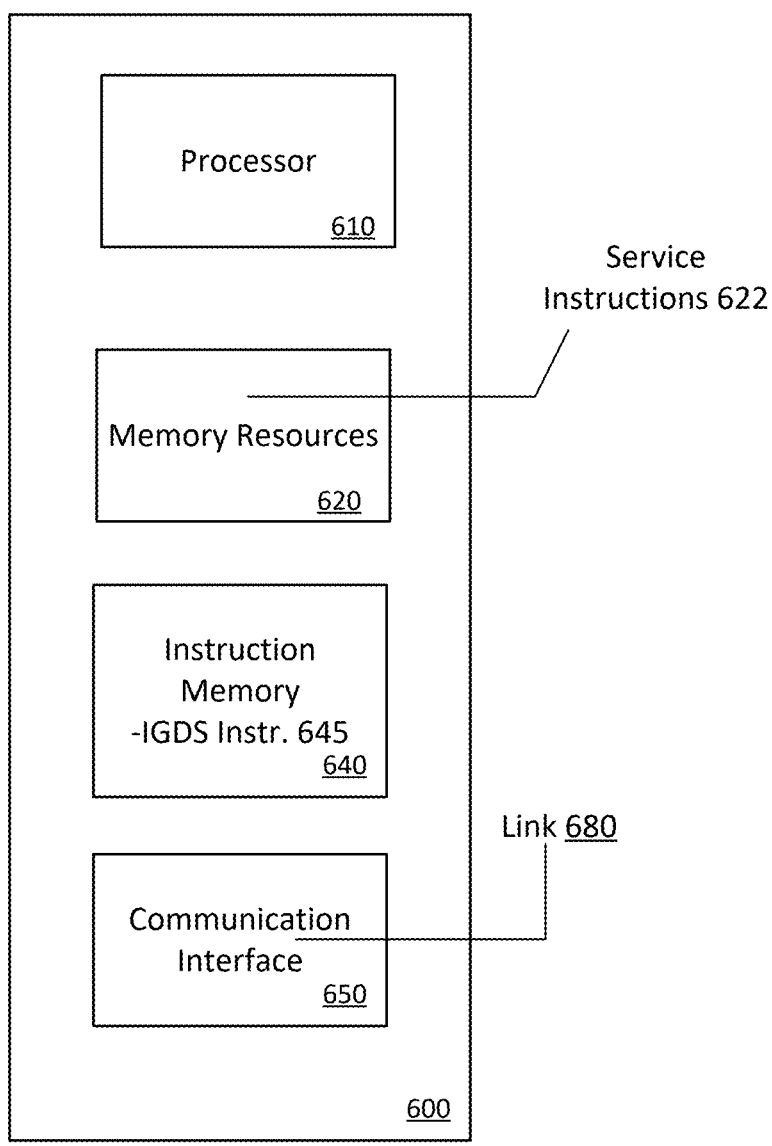
FIG. 6 illustrates a computer system on which one or more embodiments can be implemented.

FIG. 6 illustrates a computer system on which one or more embodiments can be implemented. A computer system 600 can be implemented on, for example, a server or combination of servers. For example, the computer system 600 may be implemented as the network computing system 150 of FIG. 1A through FIG. 1C.

In one implementation, the computer system 600 includes processing resources 610, memory resources 620 (e.g., read-only memory (ROM) or random-access memory (RAM)), one or more instruction memory resources 640, and a communication interface 650. The computer system 600 includes at least one processor 610 for processing information stored with the memory resources 620, such as provided by a random-access memory (RAM) or other dynamic storage device, for storing information and instructions which are executable by the processor 610. The memory resources 620 may also be used to store temporary variables or other intermediate information during execution of instructions to be executed by the processor 610.

The communication interface 650 enables the computer system 600 to communicate with one or more user computing devices, over one or more networks (e.g., cellular network) through use of the network link 680 (wireless or a wire). Using the network link 680, the computer system 600 can communicate with one or more computing devices, specialized devices and modules, and/or one or more servers.

In examples, the processor 610 may execute service instructions 622, stored with the memory resources 620, in order to enable the network computing system to implement the network service 152 and operate as the network computing system 150 in examples such as described with FIG. 1A through FIG. 1C.

The computer system 600 may also include additional memory resources ("instruction memory 640") for storing executable instruction sets ("IGDS instructions 645") which are embedded with web-pages and other web resources, to enable user computing devices to implement functionality such as described with the IGDS 100.

As such, examples described herein are related to the use of the computer system 600 for implementing the techniques described herein. According to an aspect, techniques are performed by the computer system 600 in response to the processor 610 executing one or more sequences of one or more instructions contained in the memory 620. Such instructions may be read into the memory 620 from another machine-readable medium. Execution of the sequences of instructions contained in the memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 7:
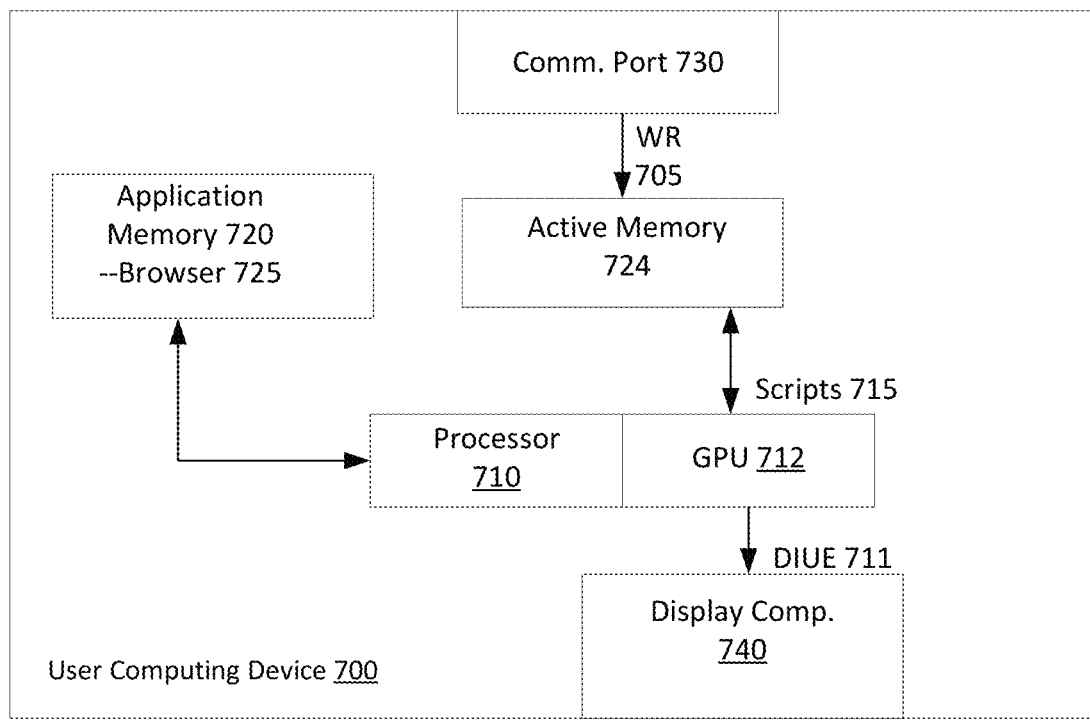
FIG. 7 illustrates a user computing device for use with one or more examples, as described.

FIG. 7 illustrates a user computing device for use with one or more examples, as described. In examples, a user computing device 700 can correspond to, for example, a workstation, a desktop computer, a laptop or other computer system having graphics processing capabilities that are suitable for enabling renderings of design interfaces and graphic design work. In variations, the user computing device 700 can correspond to a mobile computing device, such as a smartphone, tablet computer, laptop computer, VR or AR headset device, and the like.

In examples, the computing device 700 includes a central or main processor 710, a graphics processing unit 712, memory resources 720, and one or more communication ports 730. The computing device 700 can use the main processor 710 and the memory resources 720 to store and launch a browser 725 or other web-based application. A user can operate the browser 725 to access a network site of the network service 152, using the communication port 730, where one or more web pages or other resources 705 for the network service 152 (see FIG. 1A through FIG. 1C) can be downloaded. The web resources 705 can be stored in the active memory 724 (cache).

As described by various examples, the processor 710 can detect and execute scripts and other logic which are embedded in the web resource in order to implement the IGDS 100 (see FIG. 1A through FIG. 1C). In some of the examples, some of the scripts 715 which are embedded with the web resources 705 can include GPU accelerated logic that is executed directly by the GPU 712. The main processor 710 and the GPU can combine to render a UI design under edit ("UI design under edit 711") on a display component 740. The rendered design interface can include web content from the browser 725, as well as design interface content and functional elements generated by scripts and other logic embedded with the web resource 705. By including scripts 715 that are directly executable on the GPU 712, the logic embedded with the web resource 705 can better execute the IGDS 100, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
   a memory sub-system to store a set of instructions;
   one or more processors that operate to communicate the set of instructions to a plurality of user devices, wherein the set of instructions include instructions that when executed by each user device of the plurality of user devices, causes the user device to perform operations that include:
   providing a design interface to enable one or more design users to specify input to create or modify a design under edit on a canvas;
   identifying an input that identifies a selection of design elements that are rendered on the canvas;
   defining, based on the identified input, a variant component, the variant component including multiple variants that are logically linked as constituents of the variant component;
   wherein the variant component is associated with at least a state property that has multiple possible state property values, and each variant of the multiple variants is assigned to one of the multiple possible state property values;
   wherein defining the variant component includes:
   in response to receiving the identified input, making a determination as to whether the selection of design elements share a common attribute that correlates to a respective state property of the variant component;
   if the determination is that the selection of design elements shares the common attribute, automatically associate the respective state property with the selection of design elements, and prompt the design user to select a property value of the respective property for one or more design elements of the selection; and
   else prompt the design user to specify the respective state property for the selection of design components;
   providing a representation of the variant component, the representation being manipulatable with design input to render each variant of the variant component on the canvas at the same time; and
   implementing logic to simulate a run-time object based on the variant component, the run-time object being responsive to a corresponding event to transition amongst multiple states, wherein each state of the multiple states of the run-time component is based on one of the multiple variants of the variant component having at least a first value of a state property that is unique amongst the variants of the variant component.

2. The network computer system of claim 1, wherein providing the representation of the variant component includes:
   rendering the variant component by rendering each variant of the variant component at one time on the canvas.

3. The network computer system of claim 2, wherein the operations further comprise:
   providing an interactive feature to enable the design user to select an additional design element to add as a new variant of the variant component while each variant of the variant component is rendered.

4. The network computer system of claim 3, wherein the interactive feature is provided with or in proximity to the constituent variants of the variant component being rendered on the canvas.

5. The network computer system of claim 1, wherein the operations include:

implementing logic to enable the design under edit to be integrated into a functional user-interface, the functional user-interface being operable to generate an interactive element that is based on the variant component, the interactive element being responsive to a corresponding event to transition amongst multiple states, wherein each state of the multiple states of the interactive element is based on one of the multiple variants of the variant component.

6. The network computer system of claim 1, wherein defining the variant component includes (i) associating the variant component with multiple state properties, each of the multiple state properties having a corresponding set of possible state property values; and (ii) assigning each combination of state property values of the set of property values to one variant of the variant component, such that each variant of the variant component is assigned to one combination of the set of state property values.

7. The network computer system of claim 6, wherein associating the variant component with multiple state properties includes enabling the design user to specify an additional state property for a variant component.

8. The network computer system of claim 6, wherein associating the variant component with multiple state properties includes automatically identifying an additional state property based on a common property or attribute of the constituent variants of the variant component.

9. The network computer system of claim 6, wherein the operations include:
enabling the one or more design users to sort or filter the constituent variants of the variant component based on the state property value of each of the multiple state properties associated with the variant component.

10. The network computer system of claim 6, wherein enabling the one or more design users to sort or filter the constituent variants of the variant component includes generating a property value selection feature for each of the multiple state properties on one or more tool panels.

11. The network computer system of claim 6, wherein the selection of design elements are part of an existing variant component, and the respective state property is an additional state property for the variant component.

12. The network computer system of claim 6, wherein the selection of design elements identify the constituent-variants of the variant component.

13. The network computer system of claim 1, defining the variant component includes implementing a naming scheme in which each of the multiple constituent variants of the variant component are provided a name that identifies each state property that is associated with the variant component, and a state property value for each associated state property of the variant component.

14. The network computer system of claim 1, wherein the operations further comprise: structuring the variant component as a layer type having multiple layers, wherein each variant of the variant component corresponds to one of the multiple layers.

15. The network computer system of claim 10, further comprising providing the representation of the variant component on one or more tool panels by providing an indicator of each variant of the variant component, the indicator of each variant being manipulatable to render or stop rendering the respective variant, separate from other variants of the variant component.

16. The network computer system of claim 1, wherein the operations further comprise storing the variant component as a reusable item in a network library.

17. A non-transitory computer-readable medium that stores instructions, including instructions that, when executed by one or more processors of a computing system, cause the computing system to perform operations that include:
providing a design interface to enable one or more design users to specify input to create or modify a design under edit on a canvas;
identifying an input that identifies a selection of design elements that are rendered on the canvas;
defining, based on the identified input, a variant component, the variant component including multiple variants that are logically linked as constituents of the variant component;
wherein the variant component is associated with at least a property that has multiple possible property values, and where each variant of the multiple variants are assigned to one of the multiple possible property values;
wherein defining the variant component includes:
in response to receiving the identified input, making a determination as to whether the selection of design elements share a common attribute that correlates to a respective state property of the variant component;
if the determination is that the selection of design elements share the common attribute, automatically associate the respective state property with the selection of design elements, and prompt the design user to select a property value of the respective property for one or more design elements of the selection;
else prompt the design user to specify the respective state property for the selection of design components;
providing a representation of the variant component, the representation being manipulatable with design input to render each variant of the variant component on the canvas; and
implementing logic to simulate a run-time object based on the variant component, the run-time object being responsive to a corresponding event to transition amongst multiple states, wherein each state of the multiple states of the run-time component is based on one of the multiple variants of the variant component having at least a first value of a state property that is unique amongst the variants of the variant component.

18. The non-transitory computer-readable medium of claim 17, wherein the operations include:
rendering the variant component by rendering each variant of the variant component at one time on the canvas.

19. The non-transitory computer-readable medium of claim 18, wherein the operations further comprise:
providing an interactive feature to enable the design user to select an additional design element to add as a new variant of the variant component while each variant of the variant component is rendered.

20. The non-transitory computer-readable medium of claim 19, wherein the interactive feature is provided with or in proximity to the constituent variants of the variant component being rendered on the canvas.

21. The non-transitory computer-readable medium of claim 17, wherein the operations include:
implementing logic to enable the design under edit to be integrated into a functional user-interface, the functional user-interface being operable to generate an interactive element that is based on the variant component, the interactive element being responsive to a corresponding event to transition amongst multiple states, wherein each state of the multiple states of the interactive element is based on one of the multiple variants of the variant component.

22. The non-transitory computer-readable medium of claim 17, wherein defining the variant component includes (i) associating the variant component with multiple state properties, each of the multiple state properties having a corresponding set of possible state property values; and (ii) assigning each combination of state property values of the set of property values to one variant of the variant component, such that each variant of the variant component is assigned to one combination of the set of state property values.

23. The non-transitory computer-readable medium of claim 22, wherein associating the variant component with multiple state properties includes enabling the design user to specify an additional state property for a variant component.

24. The non-transitory computer-readable medium of claim 22, wherein associating the variant component with multiple state properties includes automatically identifying an additional state property based on a common property or attribute of the constituent variants of the variant component.

25. The non-transitory computer-readable medium of claim 22, wherein the operations include:
    enabling the one or more design users to sort or filter the constituent variants of the variant component based on the state property value of each of the multiple state properties associated with the variant component.

26. The non-transitory computer-readable medium of claim 22, wherein enabling the one or more design users to sort or filter the constituent variants of the variant component includes generating a property value selection feature for each of the multiple state properties on one or more tool panels.

27. The non-transitory computer-readable medium of claim 17, defining the variant component includes implementing a naming scheme in which each of the multiple constituent variants of the variant component are provided a name that identifies each state property that is associated with the variant component, and a state property value for each associated state property of the variant component.

28. The non-transitory computer-readable medium of claim 17, wherein the operations further comprise:
    structuring the variant component as a layer type having multiple layers, wherein each variant of the variant component corresponds to one of the multiple layers.

29. The non-transitory computer-readable medium of claim 27, further comprising providing the representation of the variant component on one or more tool panels by providing an indicator of each variant of the variant component, the indicator of each variant being manipulatable to render or stop rendering the respective variant, separate from other variants of the variant component.

* * * * *